US010443566B2

(12) United States Patent
Morimoto

(10) Patent No.: US 10,443,566 B2
(45) Date of Patent: Oct. 15, 2019

(54) UPWIND WIND TURBINE

(71) Applicant: KAWASAKI JUKOGYO KABUSHIKI KAISHA, Kobe-shi, Hyogo (JP)

(72) Inventor: Masafumi Morimoto, Tokyo (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 404 days.

(21) Appl. No.: 15/301,139

(22) PCT Filed: May 1, 2014

(86) PCT No.: PCT/JP2014/002390
§ 371 (c)(1),
(2) Date: Sep. 30, 2016

(87) PCT Pub. No.: WO2015/166521
PCT Pub. Date: Nov. 5, 2015

(65) Prior Publication Data
US 2017/0022973 A1    Jan. 26, 2017

(51) Int. Cl.
*F03D 7/02*    (2006.01)
*F03D 1/06*    (2006.01)

(52) U.S. Cl.
CPC ......... *F03D 7/0224* (2013.01); *F03D 1/0658* (2013.01); *F03D 1/0675* (2013.01);
(Continued)

(58) Field of Classification Search
CPC .... F03D 7/0224; F03D 1/0658; F03D 1/0675; F03D 1/0691; F03D 7/042; Y02P 70/523;
(Continued)

(56) References Cited

U.S. PATENT DOCUMENTS 8,678,767 B2 * 3/2014 Mok ................. F03D 1/025
416/142
2005/0200134 A1 * 9/2005 Shibata ............ F03D 7/0236
290/55
(Continued)

FOREIGN PATENT DOCUMENTS

JP    4-62280 U    5/1992
JP    H10-68140 A    3/1998
(Continued)

OTHER PUBLICATIONS

WO-2010109529-A1—2010 (Morimoto)—Machine Translation (Year: 2010).*
(Continued)

*Primary Examiner* — Carlos A Rivera
*Assistant Examiner* — Wayne A Lambert
(74) *Attorney, Agent, or Firm* — Oliff PLC

(57) ABSTRACT

An upwind wind turbine includes: a hub provided so as to be rotatable around a rotation axis; a plurality of blades configured to rotate together with the hub; a tilting mechanism configured to couple the hub and the blades such that the blades are tiltable relative to a rotational plane around the rotation axis; a driving device configured to drive the tilting mechanism to switch between a standing state where the blades stand and a tilted state where the blades are tilted; and a fixing/supporting mechanism provided independently from the tilting mechanism and the driving device and configured to be switched between a locked state where the blades in the standing state are prevented from tilting and an unlocked state where the blades are allowed to tilt to become the tilted state.

8 Claims, 16 Drawing Sheets

(52) U.S. Cl.
CPC .... *F03D 1/0691* (2013.01); *F05B 2240/2022* (2013.01); *F05B 2240/313* (2013.01); *F05B 2260/507* (2013.01); *Y02E 10/721* (2013.01); *Y02P 70/523* (2015.11)

(58) Field of Classification Search
CPC ........ F05B 2240/2022; F05B 2240/313; F05B 2260/507; F05B 2240/202; F05B 2260/50; F05B 2260/503; F05B 2260/76; F05B 2260/79; Y02E 10/721
USPC .................................................... 415/4.3, 48
See application file for complete search history.

(56) References Cited

U.S. PATENT DOCUMENTS

2010/0172759 A1* 7/2010 Sullivan .................... F03D 3/06
416/41
2011/0211957 A1 9/2011 Folsom et al.
2017/0022973 A1 1/2017 Morimoto

FOREIGN PATENT DOCUMENTS

| JP | 4100520 B1 | 6/2008 | |
|---|---|---|---|
| JP | 2009-162057 A | 7/2009 | |
| WO | 2010/109529 A1 | 9/2010 | |
| WO | WO-2010109529 A1 * | 9/2010 | ........... F03D 7/0224 |
| WO | 2015/166521 A1 | 11/2015 | |

OTHER PUBLICATIONS

Jul. 22, 2014 Search Report issued in International Patent Application No. PCT/JP2014/002390.

Jan. 22, 2019 Office Action issued in Japanese Patent Application No. 2016-516314.

* cited by examiner

UPWIND WIND TURBINE

TECHNICAL FIELD

The present invention relates to an upwind wind turbine, and particularly to a peripheral structure of a hub of a rotor.

BACKGROUND ART

A wind power generation facility including an upwind wind turbine has been developed. The upwind wind turbine is one type of horizontal axis wind turbine. At a normal time, a rotor to which a plurality of blades are attached is oriented upwind to be rotated, and electric power is generated based on a rotational force of the rotor. According to a typical upwind wind turbine, the blades are fixed to stand (hereinafter referred to as a "standing state") such that each of coning angles of the blades becomes substantially 0°, and the blades are rotated in a substantially vertical plane (rotational plane) around a rotation axis of the rotor.

The blades are oriented upwind. Therefore, when the wind is strong, loads from the wind to the blades (hereinafter referred to as "wind loads") increase. On this account, for example, PTL 1 discloses a technology in which: when a wind speed exceeds a threshold, the rotation of the rotor is stopped, and the postures of the blades are changed from a state where the blades are positioned in an operating plane in the standing state to a state where tip ends of the blades are tilted downwind; and with this, aspect areas (projected areas) of the blades when viewed from the upwind side are reduced while maintaining an upwind posture of the rotor, and thus, the wind loads acting on the blades when the wind is strong are reduced.

Further, for example, each of PTLs 1 and 2 proposes an upwind wind turbine including: a tilting mechanism for realizing the above operation of tilting the blades; and a driving device for driving the tilting mechanism.

CITATION LIST

Patent Literature

PTL 1: Japanese Patent No. 4100520
PTL 2: WO2010/109529A1

SUMMARY OF INVENTION

Technical Problem

At a normal time, the upwind wind turbine including the above tilting mechanism needs to stably generate electric power by surely supporting the blades in the standing state. In an emergency, such as when the wind is strong, the upwind wind turbine including the above tilting mechanism needs to quickly tilt the blades by a smooth tilting operation. Therefore, both the fixing and supporting of the blades at a normal time and the smooth tilting operation of the blades in an emergency are desired to be realized. However, this is not disclosed in PTL 1 or 2 in detail.

In view of the above circumstances, an object of the present invention is to provide an upwind wind turbine capable of surely supporting and fixing blades in a standing state at a normal time and the like and smoothly tilting the blades in an emergency and the like.

Solution to Problem

In order to solve the above problems, one aspect of the present invention is an upwind wind turbine including: a hub provided so as to be rotatable around a rotation axis; a plurality of blades configured to rotate together with the hub; a tilting mechanism configured to couple the hub and the blades such that the blades are tiltable relative to a rotational plane around the rotation axis; a driving device configured to drive the tilting mechanism to switch between a standing state where the blades stand and a tilted state where the blades are tilted; and a fixing/supporting mechanism provided independently from the tilting mechanism and the driving device and configured to be switched between a locked state where the blades in the standing state are prevented from tilting and an unlocked state where the blades are allowed to tilt to become the tilted state.

According to this configuration, the fixing/supporting mechanism supports the loads in the tilting directions of the blades such that the blades in the standing state are prevented from tilting. The fixing/supporting mechanism is provided independently from the tilting mechanism for the blades and the driving device configured to drive the tilting mechanism.

Therefore, even when the wind loads in the tilting directions act on the blades in the standing state, the blades are supported by the fixing/supporting mechanism, and the postures thereof are locked, so that the wind loads are prevented from acting on the tilting mechanism and the driving device from the blades. On this account, burdens imposed on the tilting mechanism and the driving device by the wind loads from the blades can be reduced, and the tilting mechanism and the driving device can be held satisfactorily. Thus, when switching the fixing/supporting mechanism to the unlocked state and setting the blades to the tilted state, the blades can be smoothly tilted by using the tilting mechanism and the driving device which are held satisfactorily.

The upwind wind turbine may be configured such that: the tilting mechanism includes a plurality of blade coupling portions that are coupled to the hub so as to be swingable and also coupled to the respective blades; and in the standing state, the fixing/supporting mechanism contacts the blade coupling portions to fix coning angles of the blades.

As above, by bringing the blade coupling portions and the fixing/supporting mechanism into contact with each other, the coning angles of the blades in the standing state can be fixed without bringing the blades into direct contact with the fixing/supporting mechanism.

The upwind wind turbine may be configured such that: coupled portions where the blades are coupled to the respective blade coupling portions at the hub are arranged around the rotation axis; each of the blade coupling portions includes a triangular lever structure extending from the coupled portion to the rotation axis; and the fixing/supporting mechanism is provided close to the rotation axis such that a distance between the fixing/supporting mechanism and the rotation axis is shorter than a distance between the coupled portion and the rotation axis.

As above, the blade coupling portions are configured, and the fixing/supporting mechanism is provided close to the rotation axis such that the distance between the fixing/supporting mechanism and the rotation axis is shorter than the distance between the coupled portion and the rotation axis. With this, a required load capacity of the fixing/supporting mechanism when a maximum load acts on the fixing/supporting mechanism from the blades can be reduced.

The upwind wind turbine may be configured such that: the fixing/supporting mechanism includes frame portions each extending from the hub toward a front side and contact portions each provided at the frame portion to be allowed to contact the blade coupling portion in the standing state; and the coning angles of the blades in the standing state are fixed by bringing the blade coupling portions into contact with the respective contact portions.

As above, the fixing/supporting mechanism includes the frame portions extending from the hub toward the front side. With this, the fixing/supporting mechanism and the driving device are easily arranged away from each other, and the loads acting on the fixing/supporting mechanism from the blades can be prevented from acting on the driving device.

The upwind wind turbine may be configured such that: the blades become the standing state by bringing the blade coupling portions into contact with the respective contact portions; and the blades become the tilted state by canceling the contacts between the blade coupling portions and the contact portions.

As above, the fixing/supporting mechanism is separated from the coupled portions where the blades are coupled to the respective blade coupling portions, and the fixing/supporting mechanism is provided close to the rotation axis. With this, the required load capacity of the fixing/supporting mechanism when the maximum load acts on the fixing/supporting mechanism from the blades can be reduced.

The upwind wind turbine may be configured such that: the fixing/supporting mechanism includes lock cylinders; and the contact portions are rods of the lock cylinders.

With this, the fixing/supporting mechanism can be configured by using cylinders that are relatively easily obtainable.

The upwind wind turbine may be configured such that: the driving device includes tilt cylinders; and the tilt cylinders are coupled to the hub and the respective blade coupling portions.

With this, the driving device can be configured by using cylinders that are relatively easily obtainable.

In order to solve the above problems, another aspect of the present invention is an upwind wind turbine including: a hub provided so as to be rotatable around a rotation axis; a plurality of blades configured to rotate together with the hub; a tilting mechanism configured to couple the hub and the blades such that the blades are tillable relative to a rotational plane around the rotation axis; and a driving device configured to drive the tilting mechanism to switch between a standing state where the blades stand and a tilted state where the blades are tilted, wherein the tilting mechanism includes: a plurality of blade coupling portions that are coupled to the hub so as to be swingable and also coupled to the respective blades; a screw mechanism including a screw shaft provided on the rotation axis; and a link mechanism configured to couple a nut portion of the screw mechanism to the blade coupling portions and swing the blade coupling portions in accordance with a movement of the nut portion.

According to this configuration, by a portion of the screw mechanism at which portion the screw shaft and the nut portion are threadedly engaged with each other, the loads in the tilting directions of the blades can be supported and the postures of the blades can be fixed so as to prevent the blades in the standing state from tilting.

Therefore, even when the wind loads in the tilting directions of the blades act on the blades in the standing state, the blades are supported by the screw mechanism, and the postures thereof are held. The wind loads acting on the blades are supported by the portion where the screw shaft and the nut portion are threadedly engaged with each other, so that the wind loads are less likely to act on the driving device configured to drive the tilting mechanism. Since the postures of the blades are held as above, the loads acting on the driving device can be reduced. Therefore, the driving device can be simplified.

Another aspect of the present invention may be such that the link mechanism couples the nut portion to the blade coupling portions through a sleeve configured to rotatably hold the nut portion.

According to this configuration, when the nut portion is rotated to move along the axial direction of the screw shaft, the blade coupling portions can swing.

Yet another aspect of the present invention may be such that coupled portions where the blades are coupled to the respective blade coupling portions at the hub are arranged around the rotation axis.

The coupled portions where the blades are coupled to the respective blade coupling portions at the hub are arranged as above, and the coupled portions are separated from the screw shaft provided on the rotation axis. With this, the required load capacity of the screw mechanism when the maximum load acts on the screw mechanism from the blades can be reduced.

Advantageous Effects of Invention

Each of the aspects of the present invention can provide the upwind wind turbine capable of surely supporting and fixing the blades in the standing state at a normal time and the like and smoothly tilting the blades in an emergency and the like.

DESCRIPTION OF EMBODIMENTS

From the viewpoint of operations of a wind power generation facility, wind loads received by blades of a wind turbine including a tilting mechanism will be discussed as follows.

When performing a tilting operation of the wind turbine in an emergency and the like, a nacelle is in an upwind state by yaw control, and each of pitch angles of the blades is substantially 90° by pitch control (i.e., front edges of blades face upwind). In this state, the rotation of a rotor is in a stop state, so that a relative wind speed generated at the blades in a rotational direction by the rotation of the rotor is low. Therefore, a moment in a tilting direction is relatively small (about 600 kNm, for example). Further, the tilting operation is executed only in a limited case, such as a typhoon, so that opportunities to actually perform the tilting operation are few.

On the other hand, when electric power is generated by rotating the rotor at a normal time, wind loads in the rotational direction of the rotor and wind loads from the front act on the blades. Therefore, the moment acting on each of the blades in the tilting direction is relatively large (about 5,000 kNm, for example). Therefore, according to the wind turbine including the tilting mechanism, at a normal time, the blades need to be surely supported so as to endure the wind loads for a relatively long period of time while being fixed in the standing state.

In order that the tilting mechanism supports the blades in the standing state, the tilting mechanism needs to have such a strength and structure that can endure a predetermined load burden. Therefore, the tilting mechanism needs to be increased in size, and this may cause problems when constituting the facility.

As above, according to the wind turbine including the tilting mechanism, there is still room for improvement regarding how to receive the loads from the blades. Embodiments of the present invention described below can solve these problems.

Hereinafter, the embodiments of the present invention will be explained in reference to the drawings.

Embodiment 1

Entire Configuration of Wind Turbine 1

Figure 1:
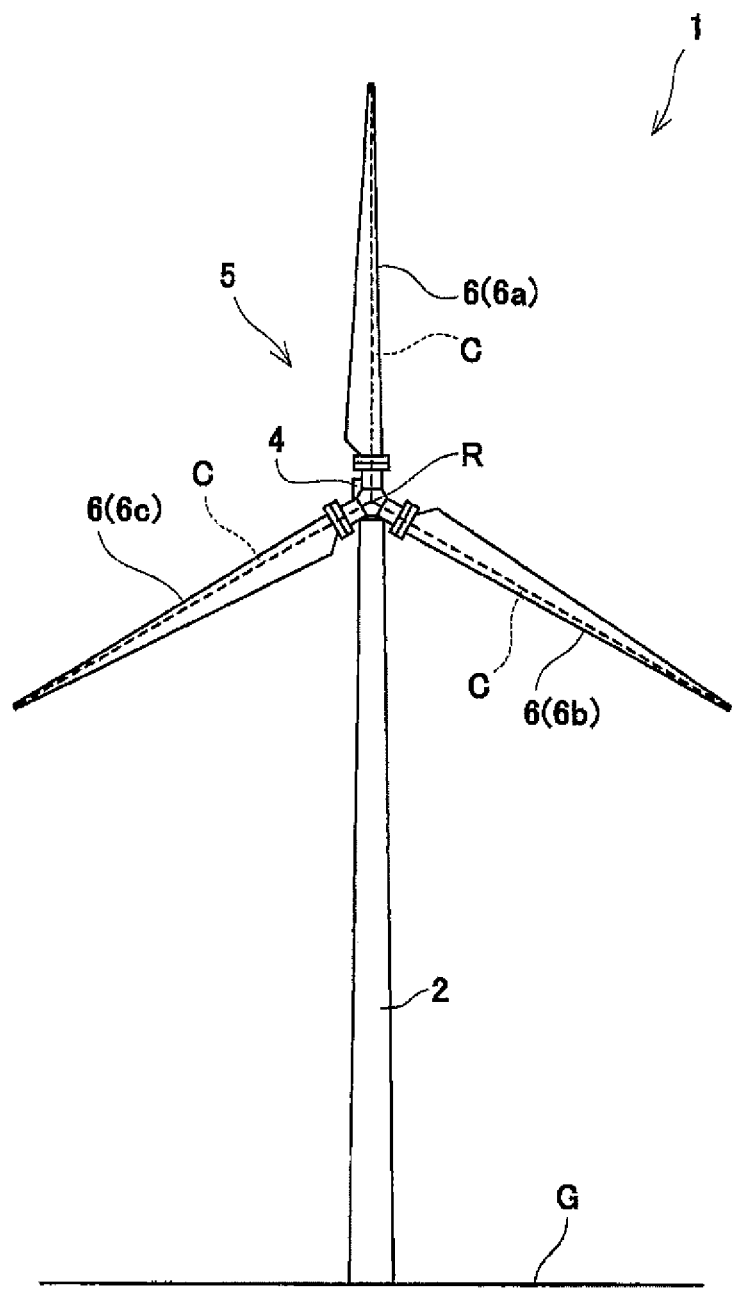
FIG. 1 is a front view of an upwind wind turbine according to Embodiment 1 of the present invention.
Figure 2:
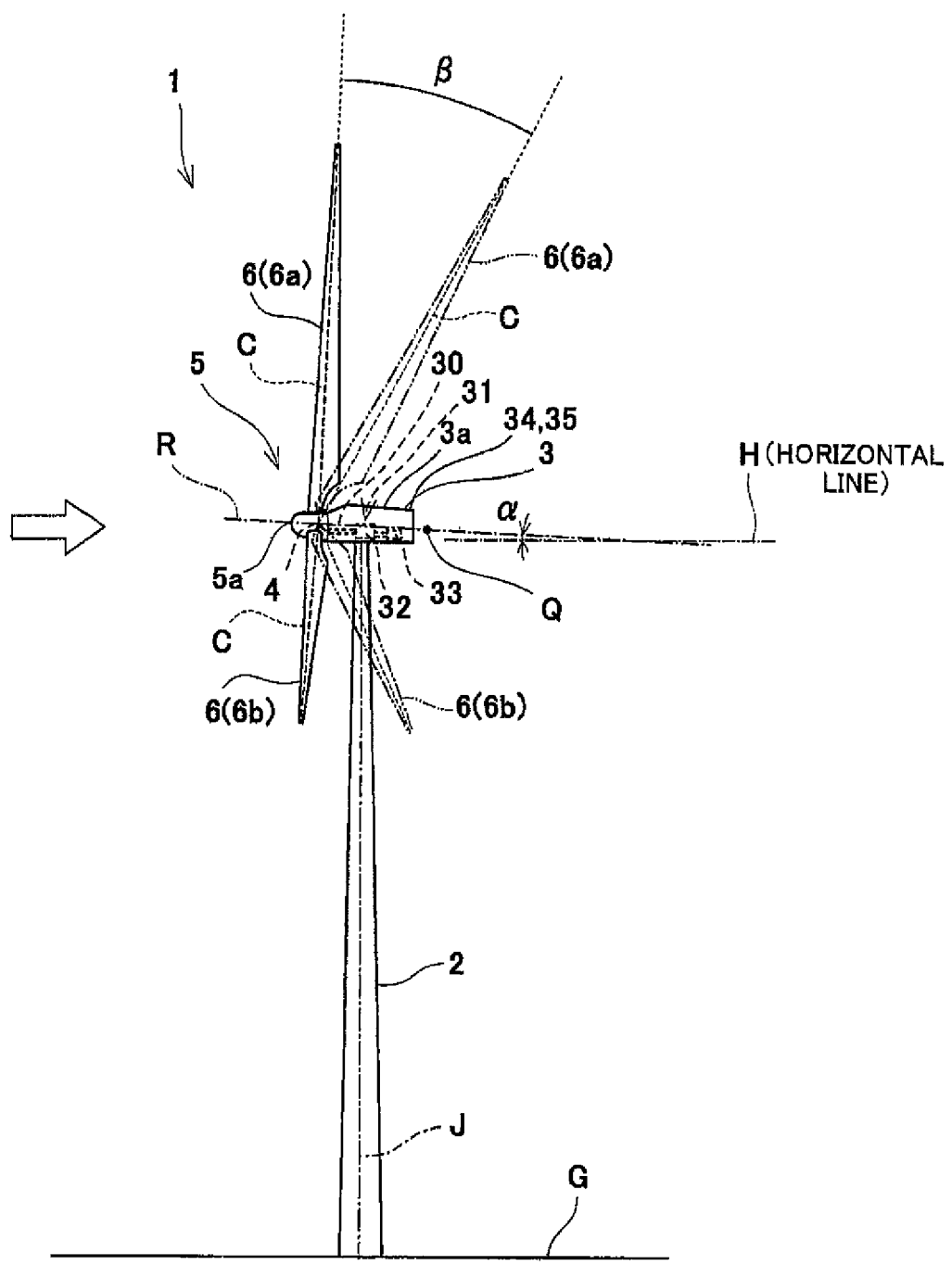
FIG. 2 is a side view of the wind turbine shown in FIG. 1.
Figure 10:
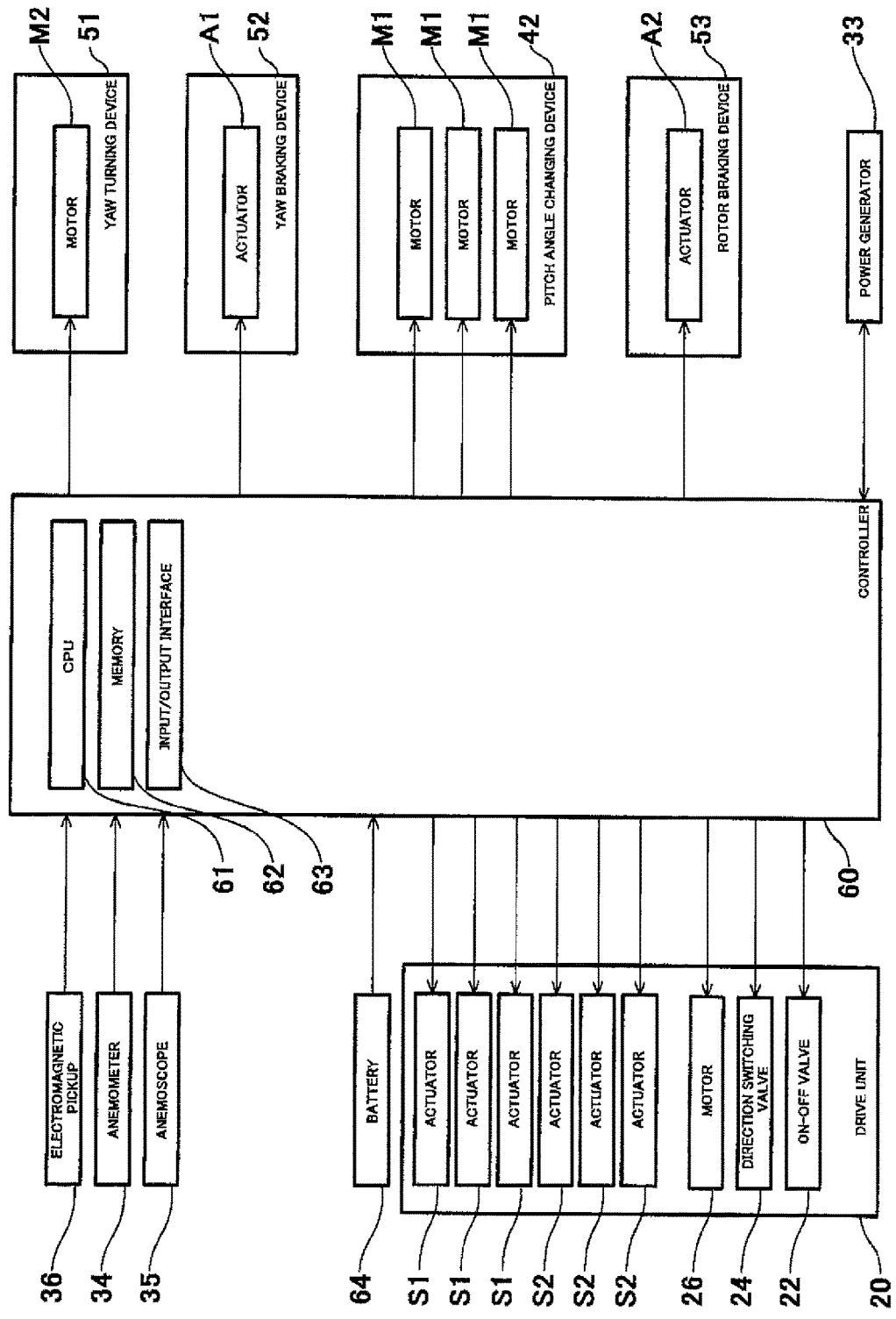
FIG. 10 is a block diagram showing a configuration of a control system of the wind turbine shown in FIG. 1.

Each of FIGS. 1, 2, and 10 shows the entire configuration of a wind turbine 1 according to Embodiment 1.

The wind turbine 1 includes: a support post (tower) 2 installed on ground G; a nacelle 3 supported by an upper end portion of the support post 2 so as to be able to turn horizontally (yaw turning); and a rotor 5. Further, the wind turbine 1 includes a controller 60 configured to entirely control behaviors of the nacelle 3, The wind turbine 1 is a so-called upwind horizontal axis wind turbine configured such that the rotor 5 faces upwind by the yaw turning of the nacelle 3 when generating electric power by wind power.

Figure 3:
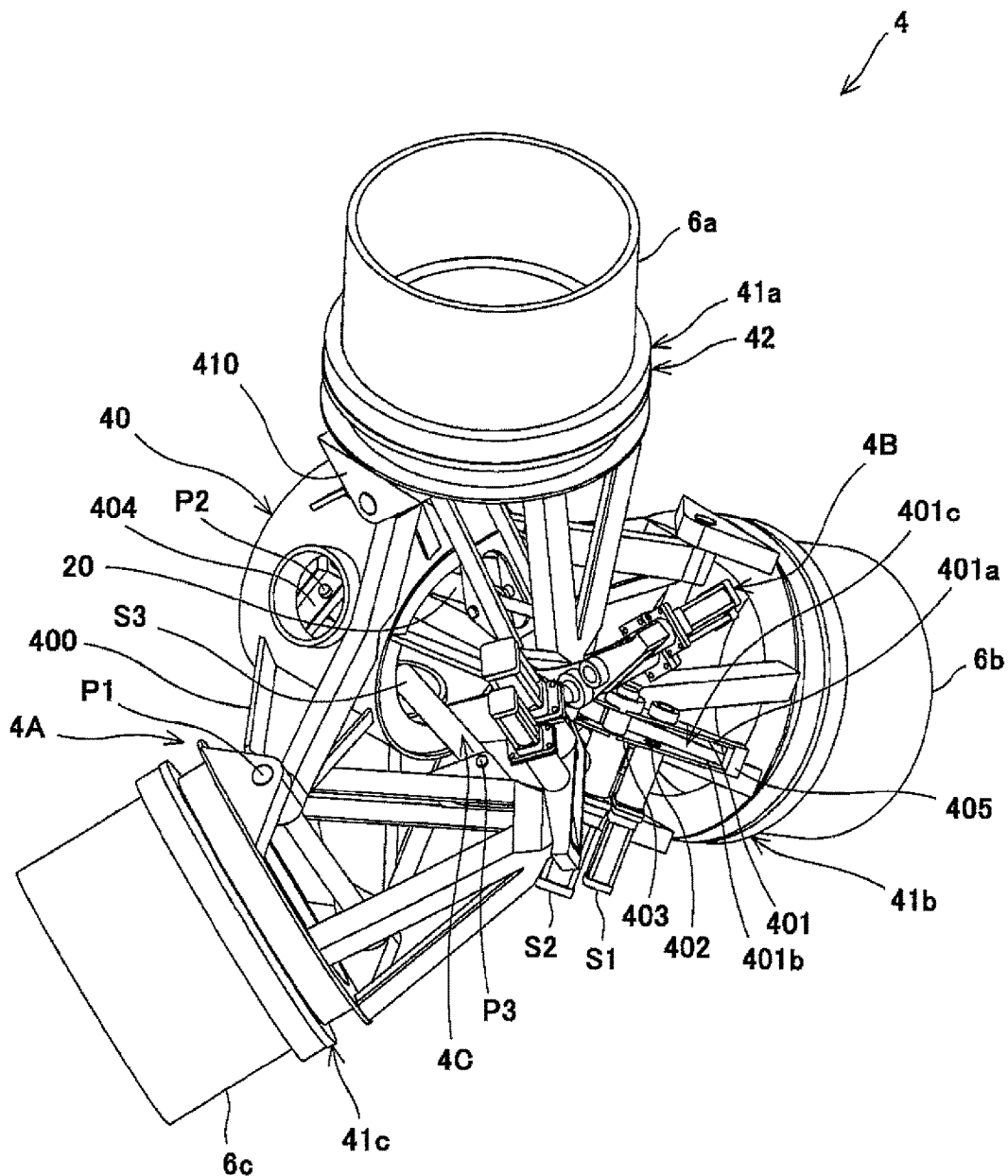
FIG. 3 is an appearance diagram of a coupling unit of the wind turbine of FIG. 1 when viewed from an oblique front side.
Figure 4:
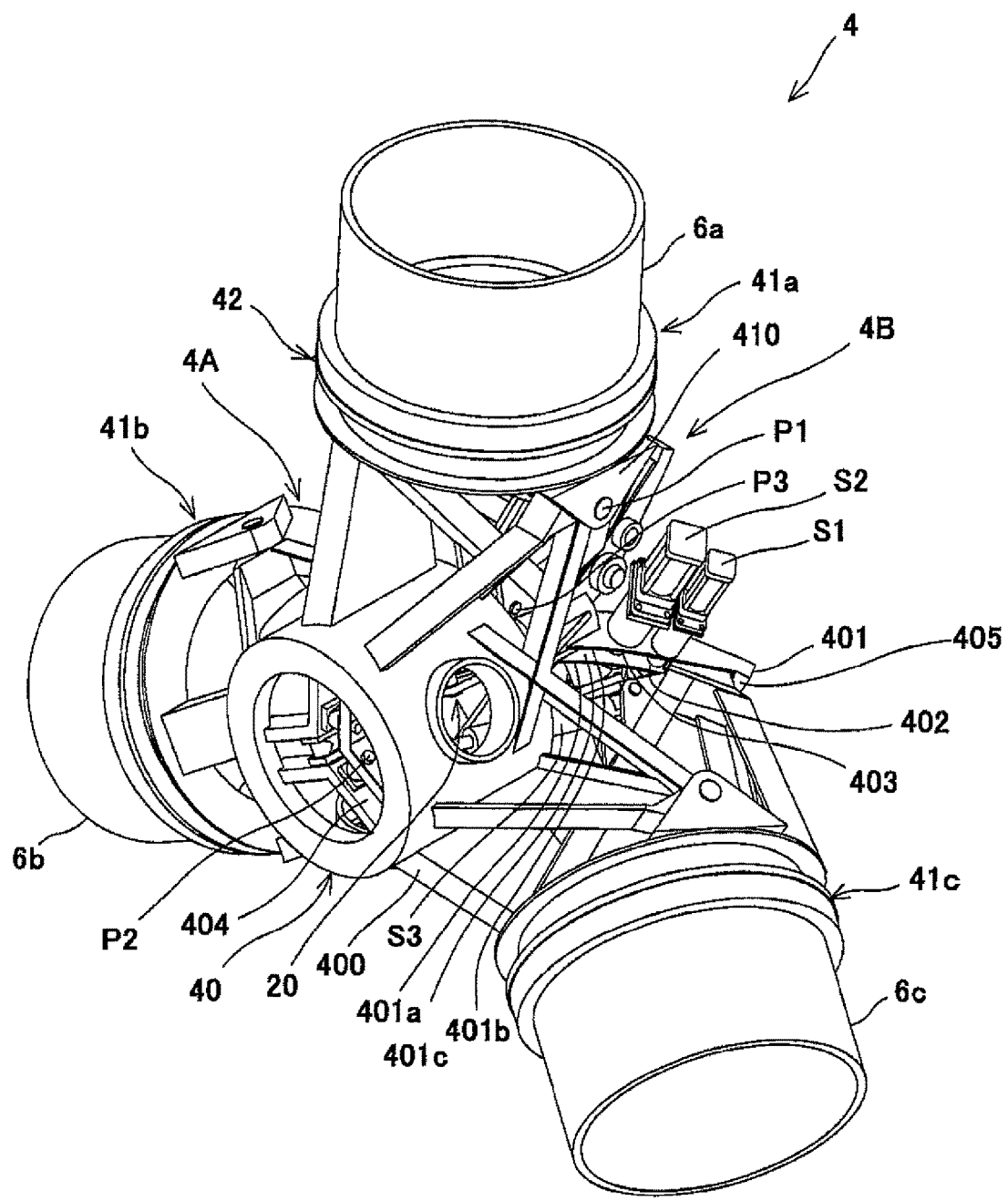
FIG. 4 is an appearance diagram of the coupling unit of the wind turbine of FIG. 1 when viewed from an oblique rear side.

The rotor 5 rotates based on the wind power and includes: a coupling unit 4 coupled to a main shaft 30 inside a cover 5a; three blades 6 (6a, 6b, and 6c) configured to rotate together with a hub 40 of the coupling unit 4 (see FIGS. 3 and 4). The wind turbine 1 is configured to generate electric power based on the rotation of the rotor 5.

The following explanations may be made on the basis that an upwind side where the rotor 5 is positioned relative to the support post 2 is referred to as a "front side," and an opposite side thereof is referred to as a "rear side."

In the wind turbine 1, the coupling unit 4 is provided so as to be rotatable around a rotation axis R extending substantially horizontally. The blades 6 are arranged so as to be spaced apart from one another by 120° around the rotation axis R and rotate integrally with the coupling unit 4. Pitch angles and coning angles of the blades 6 are variable. In the present description, the "pitch angle" denotes a rotation angle around a blade chord line C of the blade 6. The "coning angle" denotes an angle between a line orthogonal to the rotation axis R and the blade chord line C of the blade and is a value obtained by subtracting an angle between the rotation axis R and the blade chord line C from 90°.

When generating electric power, the wind turbine 1 is controlled to become the standing state in which each of the coning angles is adjusted to be substantially 0°, and the blades 6 are positioned on a plane substantially orthogonal to the rotation axis R so as to face upwind (see solid lines in FIG. 2). Further, the pitch angles of the blades 6 are adjusted such that each of attack angles of the blades 6 becomes a predetermined angle. With this, when the blades 6 receive the wind flowing toward the rotor 5 as shown by an arrow in FIG. 2, the rotor 5 rotates in a rotational plane around the rotation axis R by a lift force that acts in accordance with the attack angles, and thus, a power generator 33 of the nacelle 3 generates electric power.

On the other hand, for example, when the wind is strong, for the purpose of reducing the wind load acting on the wind turbine 1, the rotation of the rotor 5 is stopped, and the coning angles of the blades 6 are increased by the below-described tilting mechanism. With this, the wind turbine 1 is controlled to become a tilted state (contracted posture) in which the blades 6 are tilted downwind relative to the rotational plane around the rotation axis R.

As shown in FIG. 2, the rotation axis R of the wind turbine 1 is adjusted so as to be tilted upward at a tilt angle α relative to a horizontal line H toward the front side. Therefore, a distance from the blade 6 having an azimuth angle of 180° to the support post 2 becomes larger than that when the rotation axis R coincides with the horizontal line H. On this account, even when the blades 6 are bent downwind by the action of wind pressure, the blades 6 are prevented from interfering with the support post 2.

In the present description, the "azimuth angle" denotes an angle of the blade 6 in the plane orthogonal to the rotation axis R. In the wind turbine 1 shown in FIG. 1, the azimuth angles of the blades 6a, 6b, and 6c are set to 0° (360°), 120°, and 240°, respectively.

Hereinafter, the configurations of respective devices related to the behaviors of the wind turbine 1 will be explained.

Nacelle

The nacelle 3 includes the main shaft (rotor shaft) 30, a power transmission mechanism 31, and the power generator 33, which are provided in a easing 3a extending substantially horizontally. The main shaft 30 is rotated around the rotation axis R of the rotor 5 together with the rotation of the rotor 5. The power transmission mechanism 31 is provided so as to be able to transmit the power of the main shaft 30. The power generator 33 is coupled to the power transmission mechanism 31. The power transmission mechanism 31 includes a transmission 32 configured to change rotating speeds of the rotor 5 and the main shaft 30. As shown in FIG. 10, a rotor braking device 53 is provided on an output shaft (not shown) of the power generator 33 and includes an actuator A2 configured to brake the rotation of the output shaft. The rotation of the rotor 5 can be stopped in such a manner that the controller 60 operates the rotor braking device 53.

An electromagnetic pickup 36 is further provided in the casing 3a and detects a rotational phase (i.e., the azimuth angle) of the rotor 5 (see FIG. 10). Further, as shown in FIG. 2, an anemometer 34 and an anemoscope 35 are provided in the rear side of the casing 3a. The anemometer 34 detects the wind speed, and the anemoscope 35 detects a wind direction.

A yaw turning device 51 and a yaw braking device 52 are further provided in the casing 3a. The yaw turning device 51 includes a motor M2 and causes the nacelle 3 to perform yaw-turning relative to the support post 2. The yaw braking device 52 includes an actuator A1 and brakes the yaw-turning of the nacelle 3 (see FIG. 10).

Coupling Unit

Figure 5:
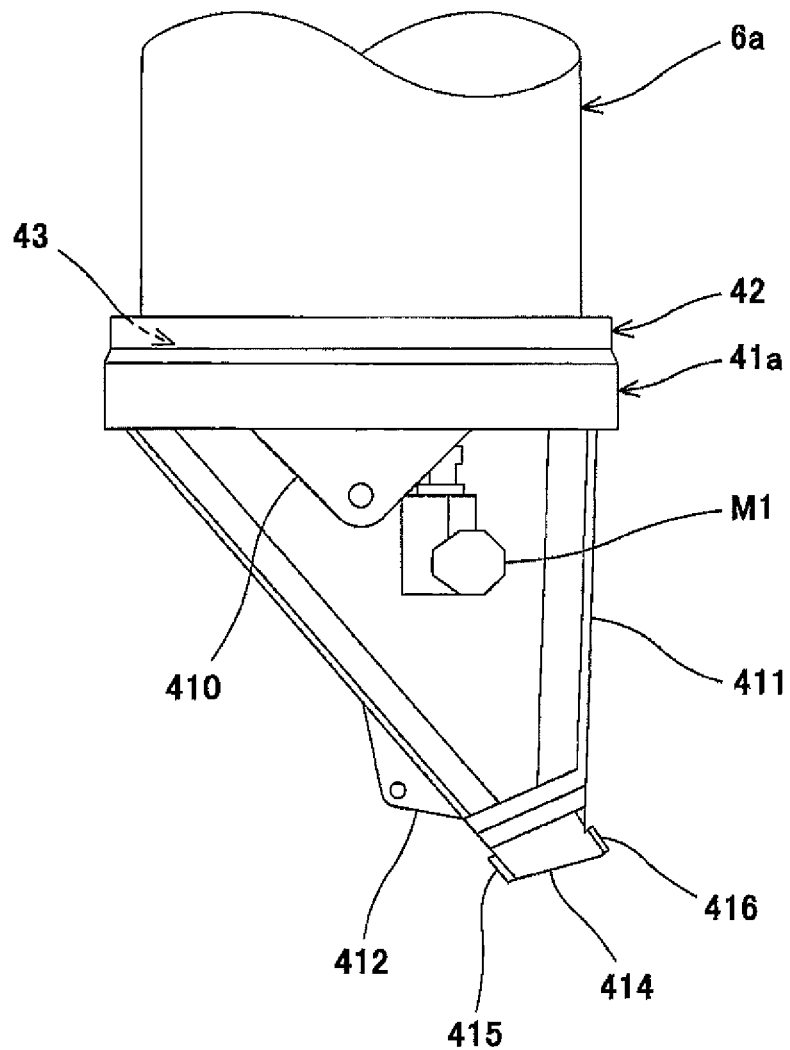
FIG. 5 is a side view showing a configuration of a blade coupling portion of the coupling unit.

As shown in FIGS. 3 to 5, the coupling unit 4 includes: the hub 40 attached to the main shaft 30; blade coupling portions 41a to 41c coupled to the hub 40; power cylinders S1 and S2 provided at frame portions 401 of the hub 40; and a plurality of power cylinders S3 each coupled to the hub 40 and the blade coupling portion 41a, 41b, or 41c.

The hub 40 is formed in a substantially cylindrical shape and includes: three brackets 400 projecting radially from an outer periphery of the hub 40; and three frame portions 401 projecting toward the front side.

The brackets 400 are the same in configuration as one another and are used for coupling the blade coupling portions 41a to 41c to the hub 40 such that the blade coupling portions 41a to 41c are swingable.

The frame portions 401 are the same in configuration as one another and extend from the hub 40 toward the front side. Each of the frame portions 401 is configured such that: plate surfaces of a pair of plate-shaped members 401a and 401b are arranged parallel to the rotation axis R: and a space 401c is formed in the frame portion 401 so as to be able to accommodate a lever tip end portion 414 of the blade coupling portion 41a, 41b, or 41c. A fixed member 405 is provided at a front tip end of the frame portion 401 so as to extend between the plate-shaped members 401a and 401b. When the blade 6 is in the tilted state, the fixed member 405 is used as a portion that contacts the lever tip end portion 414 of the blade coupling portion 41a, 41b, or 41c. Each of the plate-shaped members 401a and 401b is provided with a plurality of through holes 402 and 403 through which rods 10a and 10b of the power cylinders S1 and S2 are inserted, respectively, the rods 10a and 10b extending across the space 401c. Regarding the appearance, the frame portion 401 is fainted in an arm shape that is bent so as to be away from the rotation axis R toward the front side of the rotor 5.

The blade coupling portions 41a to 41c are the same in configuration as one another. As shown in FIGS. 3 to 5, each of the blade coupling portions 41a to 41c includes: a lever portion 411 constituted by combining a plurality of square bars; the lever tip end portion 414 provided at a tip end of the lever portion 411; and brackets 410 and 412. Base end portions of the blades 6 are coupled to the respective blade coupling portions 41a to 41c (FIGS. 3 and 4 show only the base end portions of the blades 6, and tip end portions extending from the base end portions are not shown). The brackets 410 are axially supported at a pivot P1 by the bracket 400 of the hub 40. With this, the blade 6 is coupled to the coupling unit 4 so as to be swingable relative to the coupling unit 4 around the pivot P1 as a swing center together with the blade coupling portion 41a, 41b, or 41c. As above, as a whole, each of the blade coupling portions 41a to 41c has a triangular lever structure extending to the rotation axis R from a coupled portion (pivot P1) where the blade coupling portion 41a, 41b, or 41c and the hub 40 are coupled to each other.

A pitch angle changing device 42 configured to adjust the pitch angle of the blade 6 is provided at each of the blade coupling portions 41a to 41θ. As shown in FIG. 5, the pitch angle changing device 42 includes a pitch angle adjustment mechanism 43 that axially supports the blade 6 at a bearing portion (not shown) such that the blade 6 is rotatable around the pitch angle. The pitch angle of the blade 6 is adjusted in such a manner that the blade 6 is rotated by a driving force of a motor M1.

The lever tip end portion 414 is constituted by a plate-shaped member having a plate surface spreading along the rotation axis R. When each of the blade coupling portions 41a to 41c swings around the pivot P1 as the swing center, the lever tip end portion 414 is accommodated in the space 401c of the frame portion 401. Shims 415 and 416 are provided at front and rear side surface portions of the lever tip end portion 414, respectively.

Figure 8:
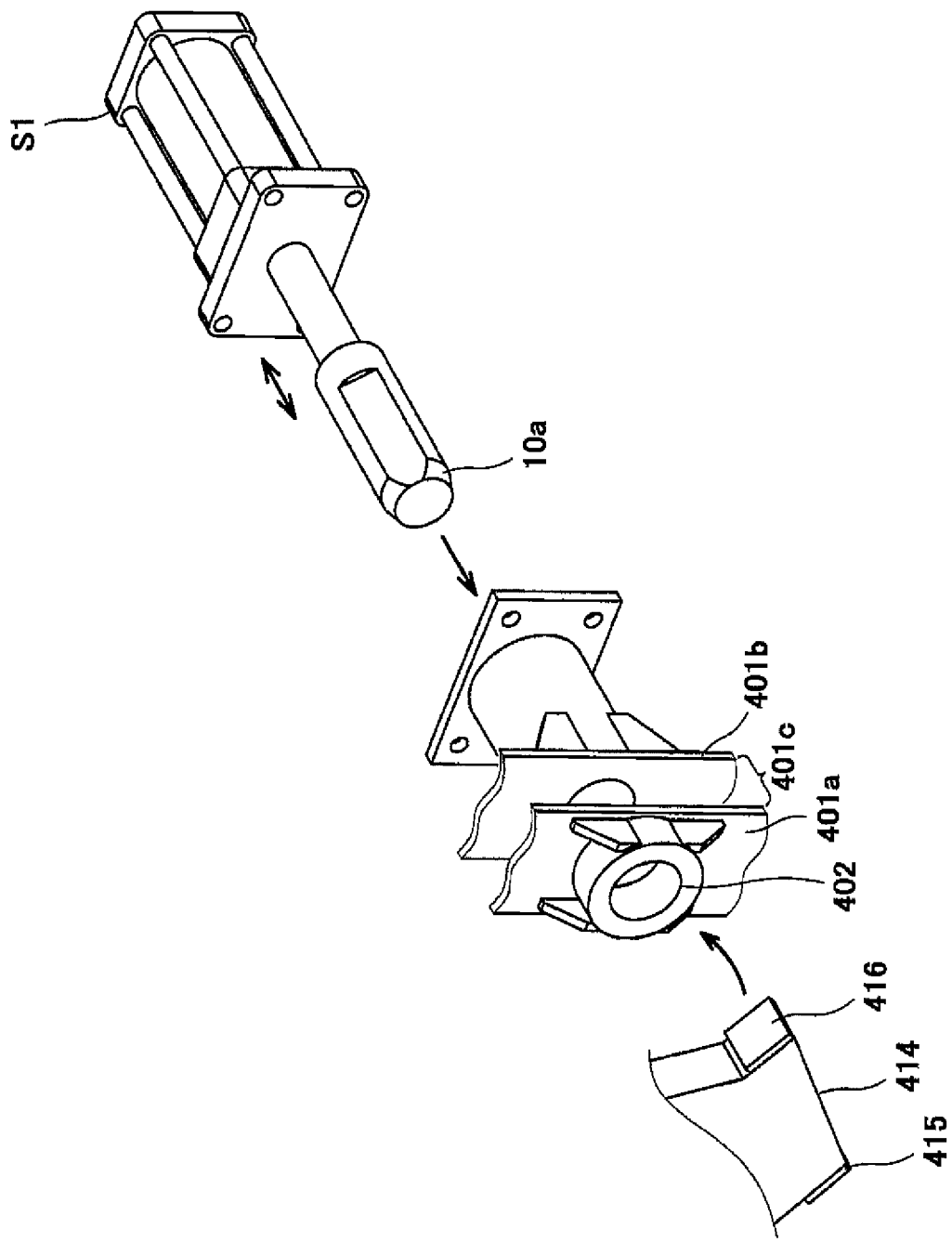
FIG. 8 shows a partial configuration of a fixing/supporting mechanism and is a development view showing a power cylinder and its vicinity.

The power cylinders S1 and S2 are, for example, hydraulic cylinders and are substantially the same in configuration as each other. The power cylinders S1 and S2 include rods 10a and 10b, respectively. The rods 10a and 10b can reciprocate, that is, expand and contract. FIG. 8 shows the configuration of the power cylinder S1 and how to fix the power cylinder S1 to the frame portion 401. The power cylinders S1 and S2 are provided at the frame portion 401 such that the rods 10a and 10b can be inserted through the through holes 402 and 403, respectively. The operations of the power cylinders S1 and S2 are controlled by the controller 60.

Figure 6:
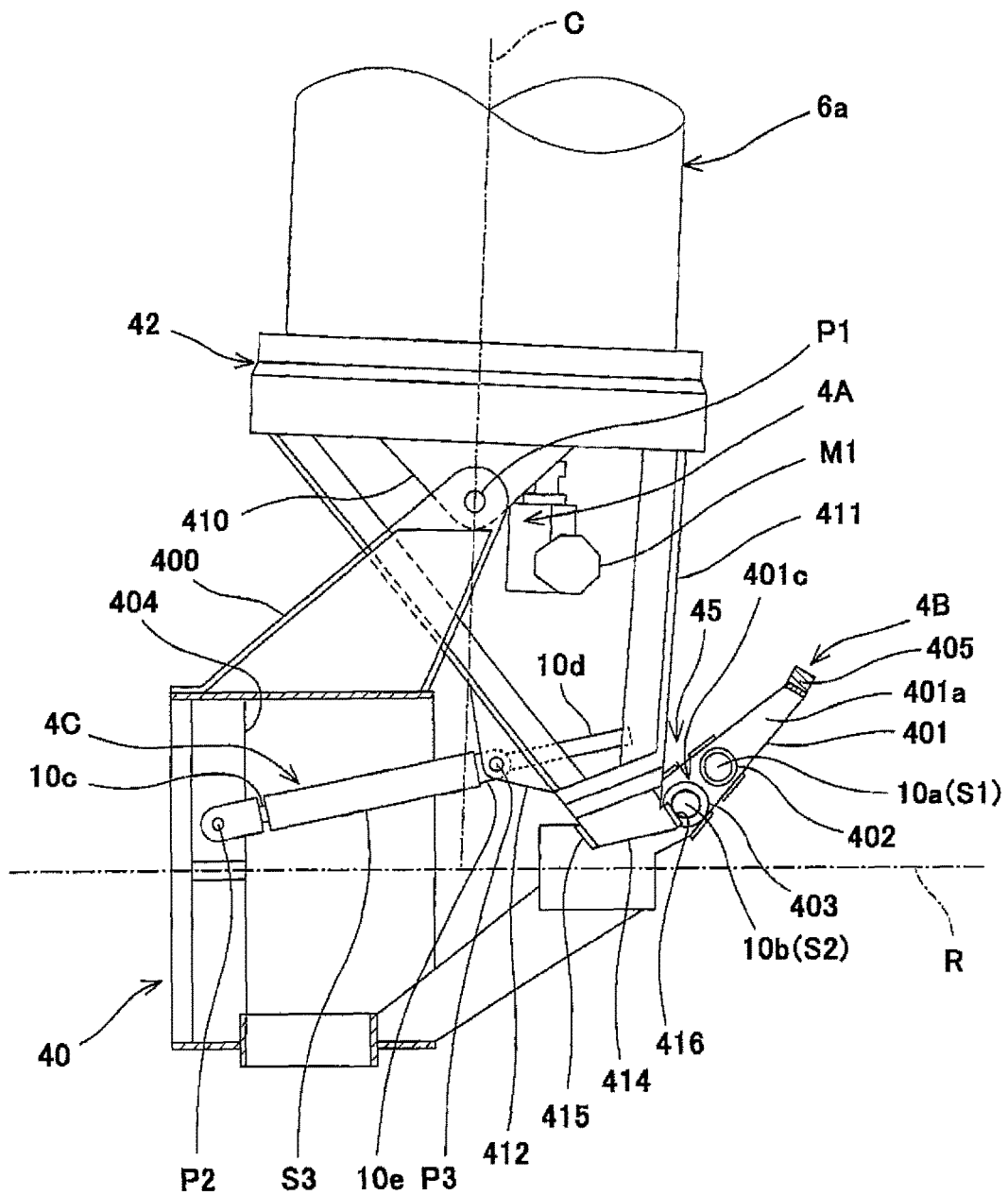
FIG. 6 is a partial cross-sectional view showing a structure of the coupling unit in a standing state.
Figure 7:
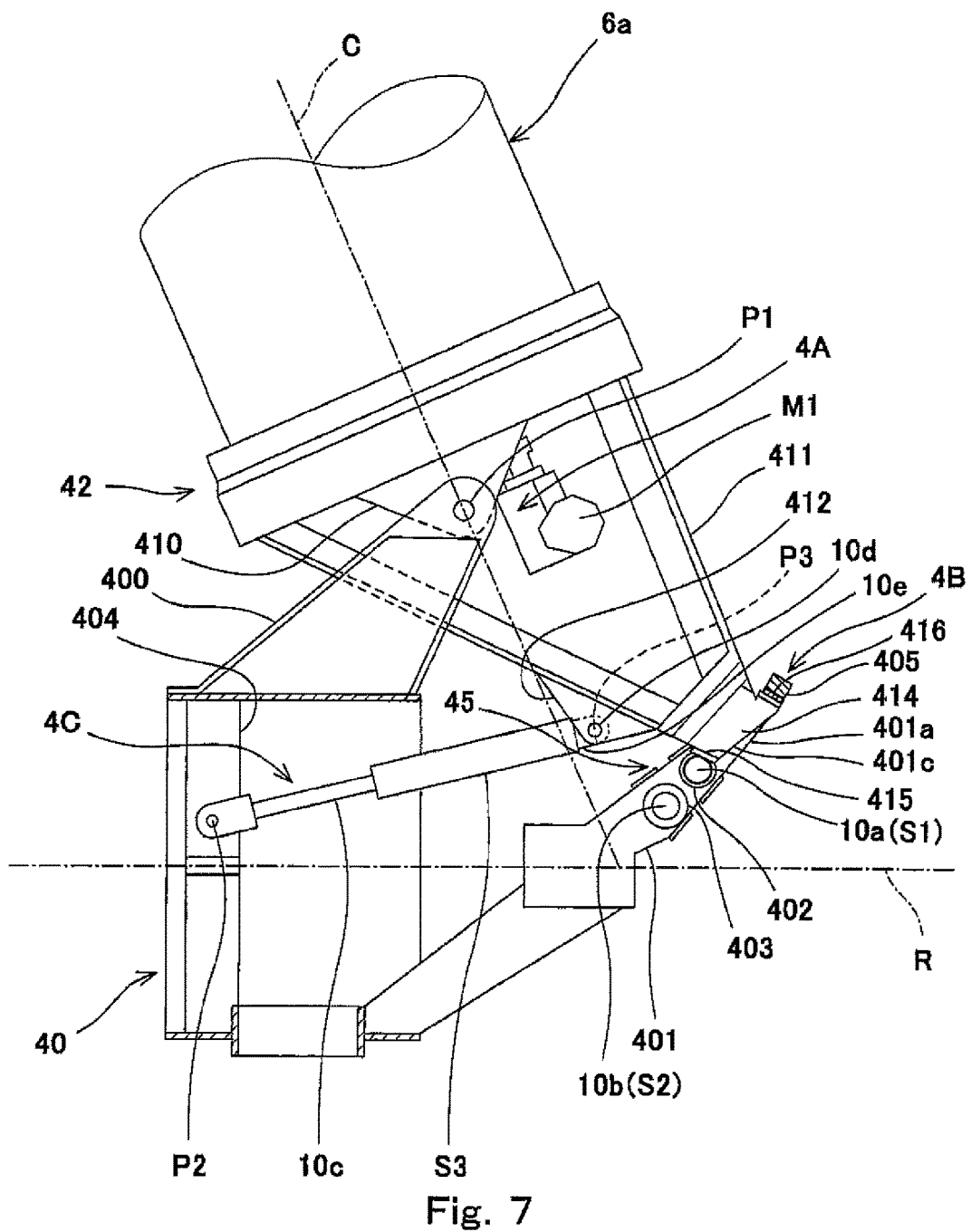
FIG. 7 is a partial cross-sectional view showing the structure of the coupling unit in a tilted state.

The power cylinder S3 is constituted by, for example, a double-shaft reciprocating hydraulic cylinder. The power cylinder S3 includes: a pair of rods 10c and 10d that can reciprocate, that is, expand and contract from both respective ends of a cylinder tube; and a cylinder main body 10e. As shown in FIGS. 6 and 7, one end of the rod 10c is axially supported at a pivot P2 by a supporting portion 404 provided inside the hub 40, and one end of the cylinder main body 10e is axially supported at a pivot P3 by the bracket 412 of the blade coupling portion 41a, 41b, or 41c. The power cylinder S3 is used as a tilt cylinder for tilting the blade 6. The operation of the power cylinder S3 is controlled by the controller 60 through a below-described drive unit 20. As shown in FIG. 6, when the rod 10c contracts, and the rod 10d expands, the blade 6 becomes the standing state. Further, as shown in FIG. 7, when the rod 10c expands, and the rod 10d contracts, the blade 6 becomes the tilted state. For simplicity, each of FIGS. 6 and 7 shows only the configurations of the blade coupling portion 41a of the coupling unit 4 and its surroundings.

A fixing/supporting mechanism 4B is provided at the hub 40 of the coupling unit 4. When the blades 6 are in the standing state, the fixing/supporting mechanism 4B contacts the blade coupling portions 41a to 41c to fix the coning angles of the blades 6. The fixing/supporting mechanism 4B specifically includes the frame portions 401 and contact portions 45 provided at the respective frame portions 401 so as to be able to contact the respective blade coupling portions 41a to 41c in the standing state. Each of the contact portions 45 specifically includes the rod 10a of the power cylinder S1 and the rod 10b of the power cylinder S2. The power cylinders S2 are used as lock cylinders in the fixing/supporting mechanism 4B.

As shown in FIG. 6, when causing the blade 6 to become the standing state, the rod 10*b* of the power cylinder S2 expands to be inserted through the through hole 403. With this, a front end portion of the lever tip end portion 414 is brought into contact with the rod 10*b* of the contact portion 45 through the shim 416. At this time, the load of the blade 6 in the tilting direction is supported by the rod 10*b*. In addition, the coning angle of the blade 6 is fixed, and the blade 6 is fixed in the standing state. The fixing/supporting mechanism 4B becomes a locked state by which the tilting of the blade 6 in the standing state is inhibited.

On the other hand, as shown in FIG. 7, when causing the blade 6 to become the tilted state, the rod 10*b* of the power cylinder S2 contracts, and the contact between the contact portion 45 and the blade coupling portion 41*a*, 41*b*, or 41*c* is canceled. With this, the blade 6 can tilt. To be specific, the fixing/supporting mechanism 4B becomes an unlocked state by which the tilting of the blade 6 in the standing state is allowed. Then, the rod 10*a* of the power cylinder S1 expands to be inserted through the through hole 402, and a rear end portion of the lever tip end portion 414 is brought into contact with a side surface of the rod 10*a* through the shim 415. In addition, the front end portion of the lever tip end portion 414 is brought into contact with the fixed member 405 through the shim 416. With this, the tilting operation of the blade 6 is completed, and the load of the blade 6 is supported by the fixed member 405. The posture of the blade 6 is fixed in the tilted state.

In the wind turbine 1, a tilting mechanism 4A configured to couple the hub 40 and the blades 6 such that the blades 6 can tilt relative to the rotational plane around the rotation axis R as above includes the hub 40 and the blade coupling portions 41*a* to 41*c*. Further, a driving device 4C configured to drive the tilting mechanism 4A such that the blades 6 are switched between the standing state and the tilted state includes the below-described drive unit 20 including the power cylinders S3. The fixing/supporting mechanism 4B is provided independently from the tilting mechanism 4A and the driving device 4C. While the wind turbine 1 is operating, the fixing/supporting mechanism 4B is switched between the locked state and the unlocked state. Such switching operation is performed by the controller 60.

As shown in FIGS. 3 to 7, it is desirable that the coupling unit 4 be configured such that: respective coupled portions (pivots P1) where the blades 6 are coupled to the respective blade coupling portions 41*a* to 41*c* at the hub 40 are arranged around the rotation axis R; and the fixing/supporting mechanism 4B is provided close to the rotation axis R such that a distance between the fixing/supporting mechanism 4B and the rotation axis R is shorter than a distance between each coupled portion (pivot P1) and the rotation axis R. In other words, it is desirable that the fixing/supporting mechanism 4B be provided at a position near the rotation axis R of the rotor 5, the position being away from the pivot P1 that is a rotational center in the tilting operation. By providing the fixing/supporting mechanism 4B at this position, a required load capacity of the fixing/supporting mechanism 4B when a maximum load acts on the fixing/supporting mechanism 4B from the blades 6 can be reduced. With this, the production of the coupling unit 4 is facilitated, and the coupling unit 4 can be reduced in size and simplified.

Drive Unit

Figure 9:
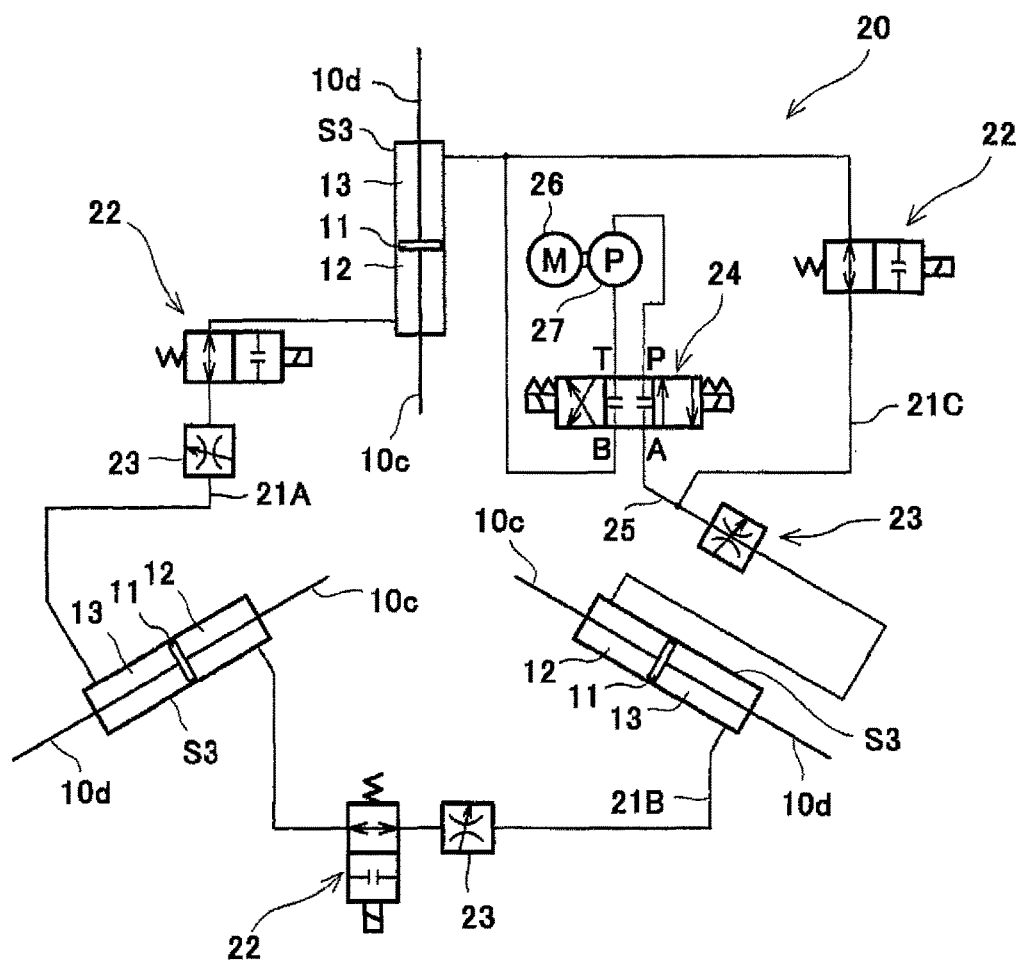
FIG. 9 is a hydraulic circuit diagram showing a partial configuration of a drive unit.

FIG. 9 shows a partial configuration of the drive unit 20. As described above, the power cylinders S3 arranged at the coupling unit 4 are provided for the respective blades 6*a*, 6*b*, and 6*c*. As shown in FIG. 9, in each of the power cylinders S3, the rod 10*c* and the rod 10*d* are provided so as to sandwich a piston 11. The power cylinder S3 includes first and second oil chambers 12 and 13 defined by the piston 11. The second oil chamber 13 of each power cylinder S3 is connected to the first oil chamber 12 of the adjacent power cylinder S3 through an oil passage 21A, 21B, or 21C.

For example, a normally open on-off valve 22 and a variable restrictor 23 are disposed on each of the oil passages 21A to 21C. An oil passage 25 on which a direction switching valve 24 is disposed is connected in parallel to a portion, located upstream of the on-off valve 22, of the oil passage 21C and a portion, located downstream of the on-off valve 22, of the oil passage 21C. A T port and P port of the direction switching valve 24 are connected to a pump 27 driven by a motor 26. The direction switching valve 24 is, for example, a closed center valve. The direction switching valve 24 is switched among a closed position at which all the ports communicate with one another, a first offset position at which the P port and an A port communicate with each other, and the T port and a B port communicate with each other, and a second offset position at which the P port and the B port communicate with each other, and the T port and the A port communicate with each other. A flow direction of operating oil can be reversed by switching between the first offset position and the second offset position. The direction switching valve 24 becomes the closed position when electric power is not supplied.

In a case where the pump 27 is driven by the motor 26 when the on-off valves 22 are open, and operating oil pressure of the first oil chamber 12 of one of the power cylinders S3 exceeds operating oil pressure of the second oil chamber 13 thereof, the piston 11 thereof operates to reduce the second oil chamber 13. In conjunction with this, the same operations are performed in the remaining two power cylinders S3. Thus, in all the power cylinders S3, the rods 10*c* contract, and the rods 10*d* expand. By these operations of the drive unit 20, the power cylinders S3 can perform the same expanding operations or contracting operations at the same timing. With this, according to the rotor 5, the blades 6 can be changed to the tilted state or the standing state at the same timing.

Controller

As shown in FIG. 10, the controller 60 includes a CPU 61, a memory 62, and an input/output interface 63 and operates by electric power supplied from any of an electric power system (not shown) provided outside the wind turbine 1, the power generator 33, and a battery 64. The motor M2 of the yaw turning device 51, the actuator A1 of the yaw braking device 52, the motors M1 of the pitch angle changing device 42, and the actuator A2 of the rotor braking device 53 are connected to the controller 60 through the input/output interface 63. Further, the motor 26, direction switching valve 24, on-off valves 22, power generator 33, three actuators S1, and three actuators S2 of the drive unit 20 are connected to the controller 60.

The CPU 61 controls the behaviors of the wind turbine 1 in accordance with the wind speed based on a predetermined control program stored in the memory 62.

Operations of Wind Turbine

When driving the wind turbine 1 configured as above, the controller 60 determines based on the control program whether or not the wind speed detected by the anemometer 34 is not less than a threshold prestored in the memory 62. This threshold can be set to, for example, a cut-out wind speed or a wind speed slightly higher than the cut-out wind speed.

When the controller 60 determines that the wind speed is less than the threshold, the controller 60 controls the wind turbine such that the wind turbine becomes a normal posture. In this case, based on the wind direction detected by the anemoscope 35, the controller 60 drives the motor M2 of the yaw turning device 51 and stops the actuator A1 of the yaw braking device 52 to perform the yaw turning of the nacelle 3 such that the rotor 5 faces upwind. Then, the controller 60 sets the position of the direction switching valve 24 to the first offset position and also closes one on-off valve 22 connected in parallel to the direction switching valve 24 and opens the remaining two on-off valves 22 (see FIG. 9). With this, as shown in FIG. 6, the rods 10c contract and the rods 10d expand in the power cylinders S3. After that, to maintain this state, the position of the direction switching valve 24 is switched from the first offset to the closed position, and all the on-off valves 22 are closed. At this time, in the coupling unit 4, the blade coupling portions 41a to 41c operate in accordance with the operations of the power cylinders S3. Thus, each of the coning angles of the blades 6 is adjusted to substantially 0°, and the blades 6 become the standing state. Further, the controller 60 causes the rods 10b of the power cylinders S2 to expand. With this, the rotor 5 rotates based on the wind blowing against the wind turbine, and the power generator generates electric power based on a rotational driving force of the rotor 5.

In these operations at a normal time, the wind loads in the rotational direction of the rotor 5 and the wind loads in a predetermined tilting direction act on the blades 6. As shown in FIG. 6, in the wind turbine 1, each blade 6 is supported at the pivot P1 that is the coupled portion where the coupling unit 4 is coupled to the blade coupling portion 41a, 41b, or 41c, and the front end portion of the lever tip end portion 414 of the blade coupling portion 41a, 41b, or 41c contacts and is supported by the rod 10b of the power cylinder S2 through the shim 416, the power cylinder S2 being provided at the frame portion 401 of the coupling unit 4. As above, the wind loads in the tilting direction of the blades 6 are satisfactorily supported by the fixing/supporting mechanism 4B and are less likely to act on the tilting mechanism 4A and the driving device 4C.

Further, although the wind load in the tilting direction acts on the blade 6 at this time, the lever tip end portion 414 contacts the rod 10b of the power cylinder S2, so that the standing state of the blade 6 is fixed. Therefore, the standing state of the blade can be satisfactorily fixed by the fixing/supporting mechanism 4B without fixing the posture of the blade 6 by the tilting mechanism 4A or the driving device 4C.

On the other hand, when the controller 60 determines that the wind speed is not less than the threshold, the controller 60 stops the wind turbine 1 and adjusts the posture of the wind turbine 1 to the tilted state while maintaining the upwind posture. In this case, the controller 60 first drives the motors M1 of the pitch angle changing device 42 to adjust the pitch angles of the blades 6 such that air resistances acting on the blades 6 in the rotational direction of the rotor 5 are increased. With this, the rotating speed of the rotor 5 is reduced. When the rotating speed of the rotor 5 is reduced to not more than a predetermined speed after a predetermined time, the controller 60 refers to an input signal supplied from the electromagnetic pickup 36 and operates the rotor braking device 53 to stop the blades 6 at a predetermined rotation angle position (i.e., the azimuth angle). The rotation angle position at this time is a position at which the blades 6 can tilt downwind without interfering with the support post 2, that is, a position at which the blades 6 do not overlap the support post 2 when viewed from a direction along the rotation axis R of the rotor 5. Stopping the rotation at the predetermined rotation angle position can also be performed in such a manner that: the power generator 33 is temporarily operated as a drive motor by supplying electric power to the power generator 33; and the drive motor controls the rotation of the rotor 5 to adjust the stop rotation angle position of the rotor 5.

The controller 60 causes the rods 10b of the power cylinders S2 to contract based on the control program. Further, based on the control program, the controller 60 maintains the closed position of the direction switching valve 24 and opens all the on-off valves 22. With this, the oil passage 25 is shut off from the pump 27. At this time, by the wind loads acting on the blades 6 and the weights of the blades 6, in all the power cylinders S3, the operating oil flows from the first oil chambers 12 to the second oil chambers 13, and as shown in FIG. 7, the rods 10c expand, and the rods 10d contract.

In accordance with these operations, in the wind turbine 1, as shown in FIG. 7, each of the blades 6 tilts around the pivot P1, as the swing center, which is the coupled portion where the coupling unit 4 is coupled to the blade coupling portion 41a, 41b, or 41c. As a result, as shown in FIG. 2, the blade 6 tilts toward the rear side until the coning angle becomes a predetermined angle β. At this time, the controller 60 causes the rods 10a of the power cylinders S1 to expand after tilting the blade coupling portions 41a to 41c. With this, the front end portion of the lever tip end portion 414 contacts the fixed member 405 through the shim 416, and the lever tip end portion 414 also contacts the rod 10a of the power cylinder S1 through the shim 415. As a result, the blades 6 are supported in the tilted state. The wind loads acting on the blades 6 and the weights of the blades 6 act on the driving device 4C during this tilting operation, but the force of the wind loads and the weights is much lower than the wind loads acting on the blades 6 at a normal time of the wind turbine 1. Further, since a time it takes to perform the tilting operation is much shorter than the normal time, a possibility that a large load acts from the blades 6 to the driving device 4C during the tilting operation is relatively low.

The amount of oil flowing through each of the oil passages 21A to 21C during the tilting operation is controlled in such a manner that the controller 60 adjusts the variable restrictor 23. By increasing a restriction amount of the variable restrictor 23, a speed of the tilting operation of the blade 6 can be controlled to a low speed. Further, the controller 60 continuously operates the rotor braking device 53 even during the tilting operation and adjusts the rotational position of the rotor 5 to prevent the blades 6 from interfering with the support post 2.

As above, Embodiment 1 can provide the upwind wind turbine that can be expected to surely support the blades 6 in the standing state at a normal time and perform the smooth tilting operations of the blades 6 by the tilting mechanism in an emergency and the like.

When the blades 6 become the tilted state, as shown in FIG. 2, a center Q of the total of the loads acting on the blades 6 is positioned at the downwind side of a center axis J of the support post 2. Therefore, even when electric power is not supplied to the wind turbine 1, the nacelle 3 automatically turns based on the loads acting on the blades 6 such that the rotor 5 faces upwind. Therefore, even when electric power is not supplied to the actuator A1 of the yaw turning device 51, the upwind state of the rotor 5 can be satisfactorily maintained by automatically turning the nacelle 3 in such a manner that the actuator A1 of the yaw braking device 52 is adjusted to a non-operating state or a braking weakened state.

Further, according to the wind turbine 1, by setting the direction switching valve 24 to the closed position and opening the on-off valves 22, the driving device 4C and the tilting mechanism 4A can be operated, and the blades 6 can be set to the tilted state by an external force. Therefore, the wind turbine 1 is configured such that the on-off valve 22 are normally open valves, and the direction switching valve 24 becomes the closed position when electric power is not supplied. With this, even when electric power is not supplied, the blades 6 can automatically tilt by the wind power and the weights of the blades 6 without consuming the electric power of the battery 64.

Further, as shown in FIG. 2, the wind turbine 1 is angled at the tilt angle α. Therefore, when the blades 6 become the tilted state, a moment in such a direction that the coning angle β increases acts on the blade 6a, and a moment in such a direction that the coning angle β decreases acts on each of the blades 6b and 6c. With this, the blades 6 in contracted postures can maintain their postures by themselves.

Hereinafter, differences between another embodiment of the present invention and Embodiment 1 will be mainly explained.

Embodiment 2

Each of FIGS. 11 to 14 shows the configuration of a coupling unit 7 of the rotor of the wind turbine according to Embodiment 2. The coupling unit 7 corresponds to the coupling unit 4 of Embodiment 1 and includes: a hub 70 attached to the main shaft 30 (see FIG. 2) that rotates around the rotation axis R; blade coupling portions 71a to 71c coupled to an outer peripheral portion of the hub 70 so as to surround the rotation axis R and be swingable; a screw mechanism 8 provided at a center portion of the hub 70; and a plurality of coupling arms 72 each coupled to a moving unit 83 of the screw mechanism 8 and the blade coupling portion 71a, 71b, or 71c.

The hub 70 includes: three brackets 700; and a columnar shaft-shaped base portion 73 located at a center of the hub 70 and projecting toward the front side.

Each of brackets 710 is a portion to which the blade coupling portion 71a, 71b, or 71c is coupled so as to be swingable. A screw shaft 80 of the screw mechanism 8 is provided at the shaft-shaped base portion 73 so as to be located on the rotation axis R.

Figure 11:
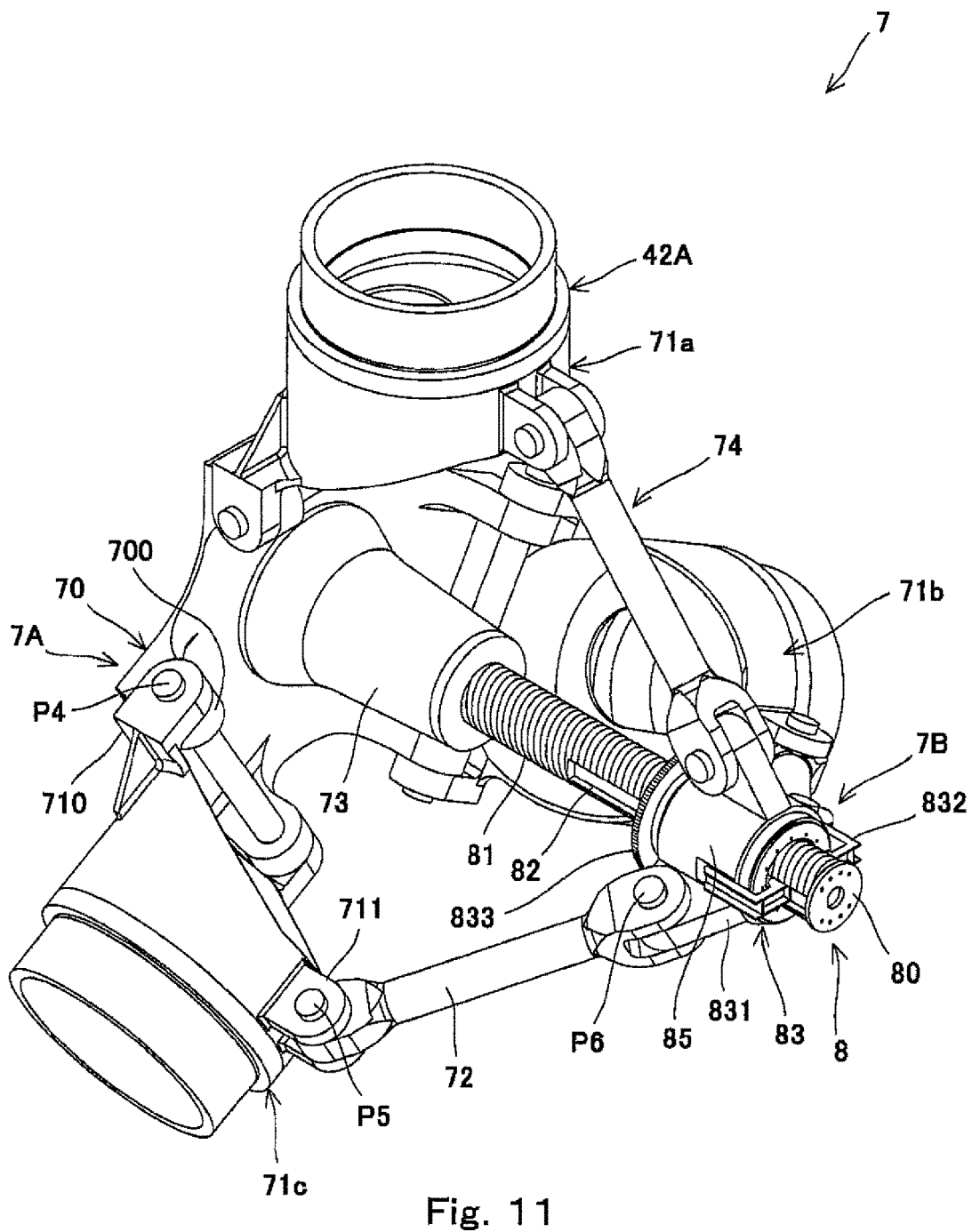
FIG. 11 is an appearance diagram of the coupling unit in the upwind wind turbine according to Embodiment 2 of the present invention when viewed from the oblique front side.
Figure 12:
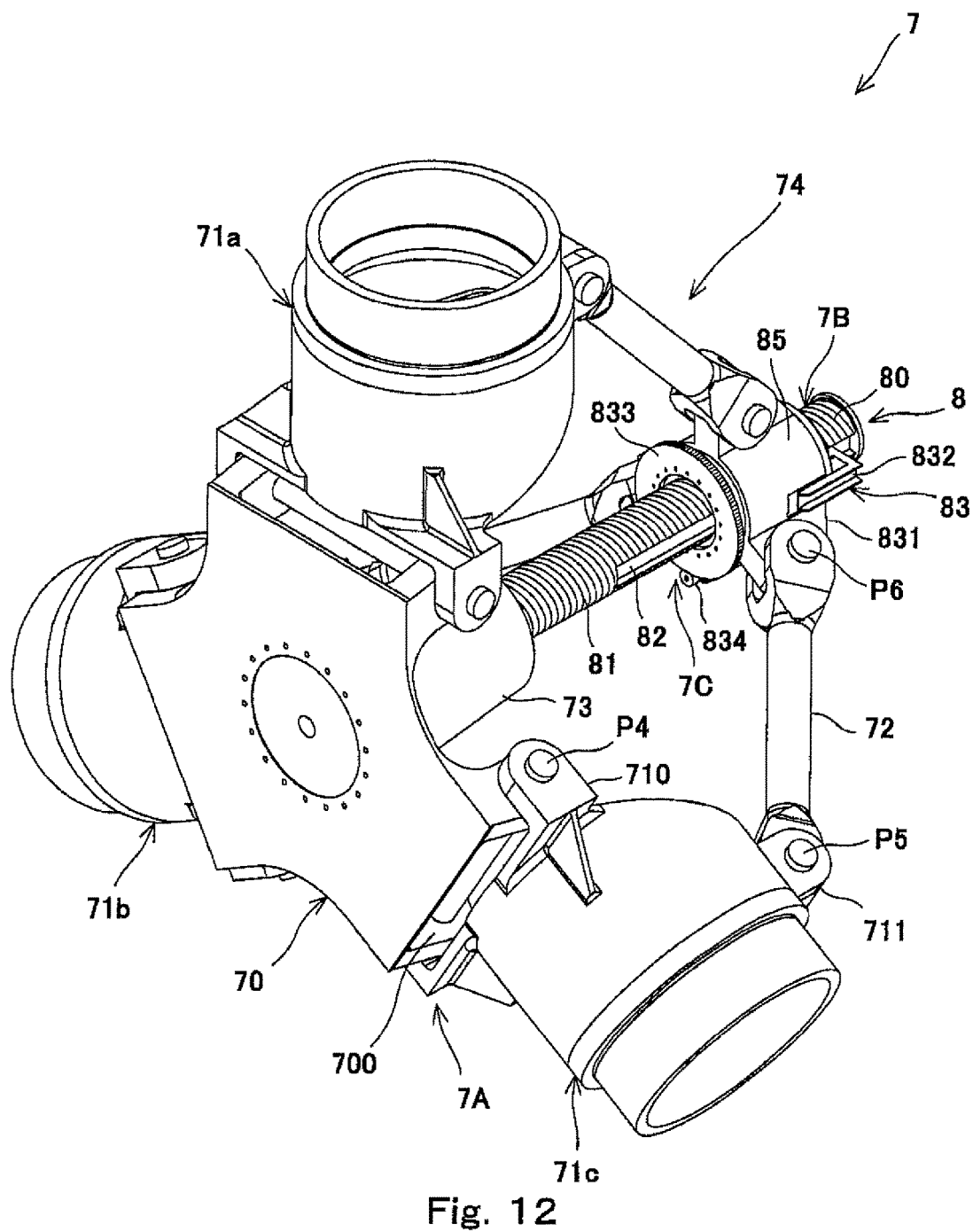
FIG. 12 is an appearance diagram of the coupling unit in the upwind wind turbine according to Embodiment 2 of the present invention when viewed from the oblique rear side.

The blade coupling portions 71a to 71c are the same in configuration as one another, and each of the blade coupling portions 71a to 71c includes two brackets 710 and 711. Base end portions of the blades 6 are coupled to the respective blade coupling portions 71a to 71c. FIGS. 11 and 12 show only the base end portions of the blades 6, and tip end portions extending from the base end portions are not shown.

With this configuration, each of the blades 6 is coupled to the coupling unit 7 so as to be swingable around a pivot P4. In the coupling unit 7, the bracket 710 of each of the blade coupling portions 71a to 71c is axially supported at the pivot P4 by the bracket 700 of the hub 70. In the coupling unit 7, coupled portions (pivots P4) where the blades 6 are coupled to the respective blade coupling portions 71a to 71c at the hub 70 are arranged around the rotation axis R. The bracket 711 is axially supported at a pivot P5 by one end of the coupling arm 72. As with Embodiment 1, a pitch angle changing device 42A configured to adjust the pitch angle of the blade 6 is provided at each of the blade coupling portions 71a to 71c.

The screw mechanism 8 includes: the screw shaft 80 provided at the shaft-shaped base portion 73 so as to extend toward the front side and be located on the rotation axis R of the rotor; the moving unit 83 provided at the screw shaft 80; and a motor M3.

A first threaded portion 81 and a pair of groove portions 82 are formed on a peripheral surface of the screw shaft 80. The groove portions 82 extend in an axial direction of the screw shaft 80 so as to be located at respective positions sandwiching a center axis of the screw shaft 80 and symmetrical to each other.

Figure 13:
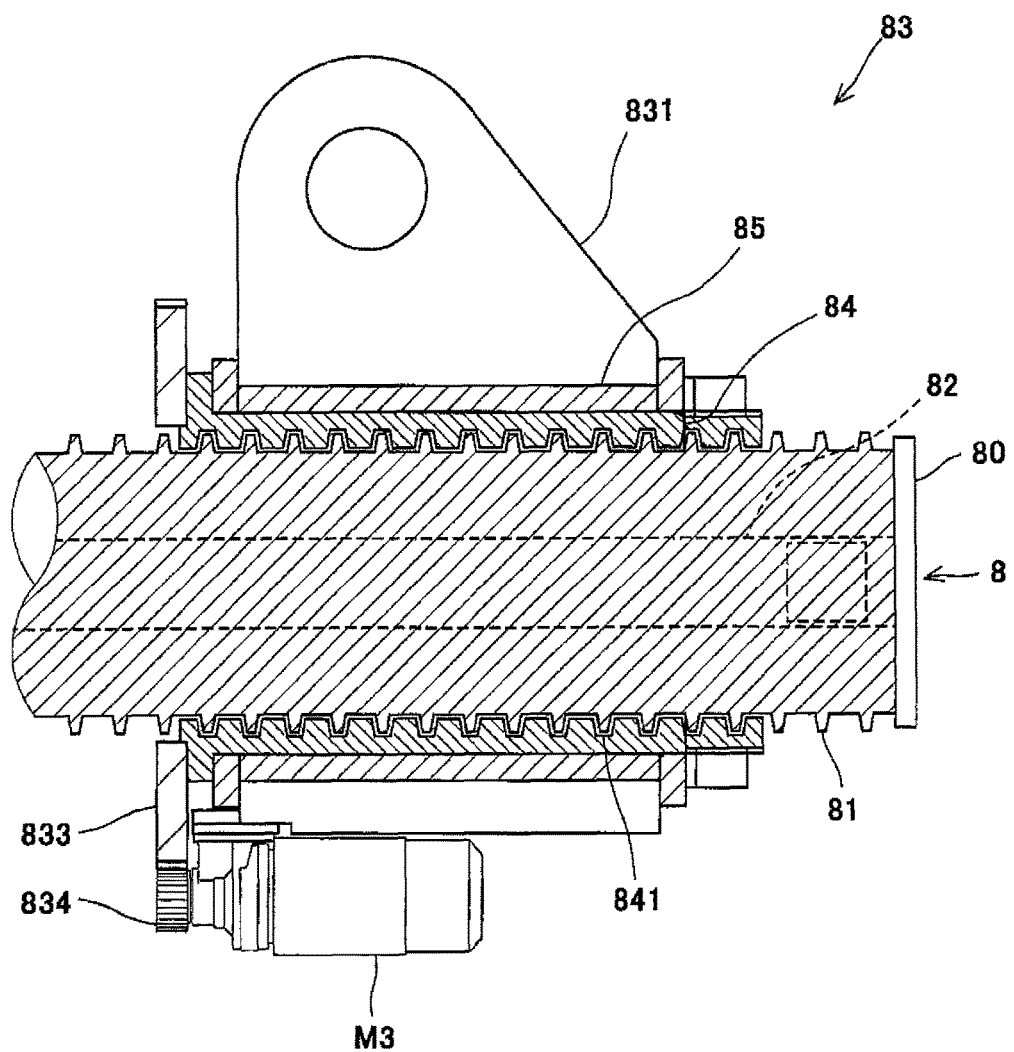
FIG. 13 is an enlarged cross-sectional view showing a partial configuration of a moving unit of a screw mechanism and its vicinity.

The moving unit 83 includes a nut portion 84, a sleeve 85, and a spur gear 833. The nut portion 84 is provided so as to cover the peripheral surface of the screw shaft 80. The sleeve 85 is provided at the nut portion 84 and holds the nut portion 84 in both thrust directions and a radial direction using a slide bushing, a rolling bushing, or a bearing. The spur gear 833 is provided at one end of the nut portion 84 in the axial direction of the screw shaft 80. Three brackets 831 are provided on an outer peripheral surface of the sleeve 85 so as to be equally spaced apart from one another in a circumferential direction of the sleeve 85. It should be noted that FIG. 13 shows only one bracket 831 at the moving unit 83. The other end of the coupling arm 72 is axially supported at a pivot P6 by the bracket 831.

Figure 14:
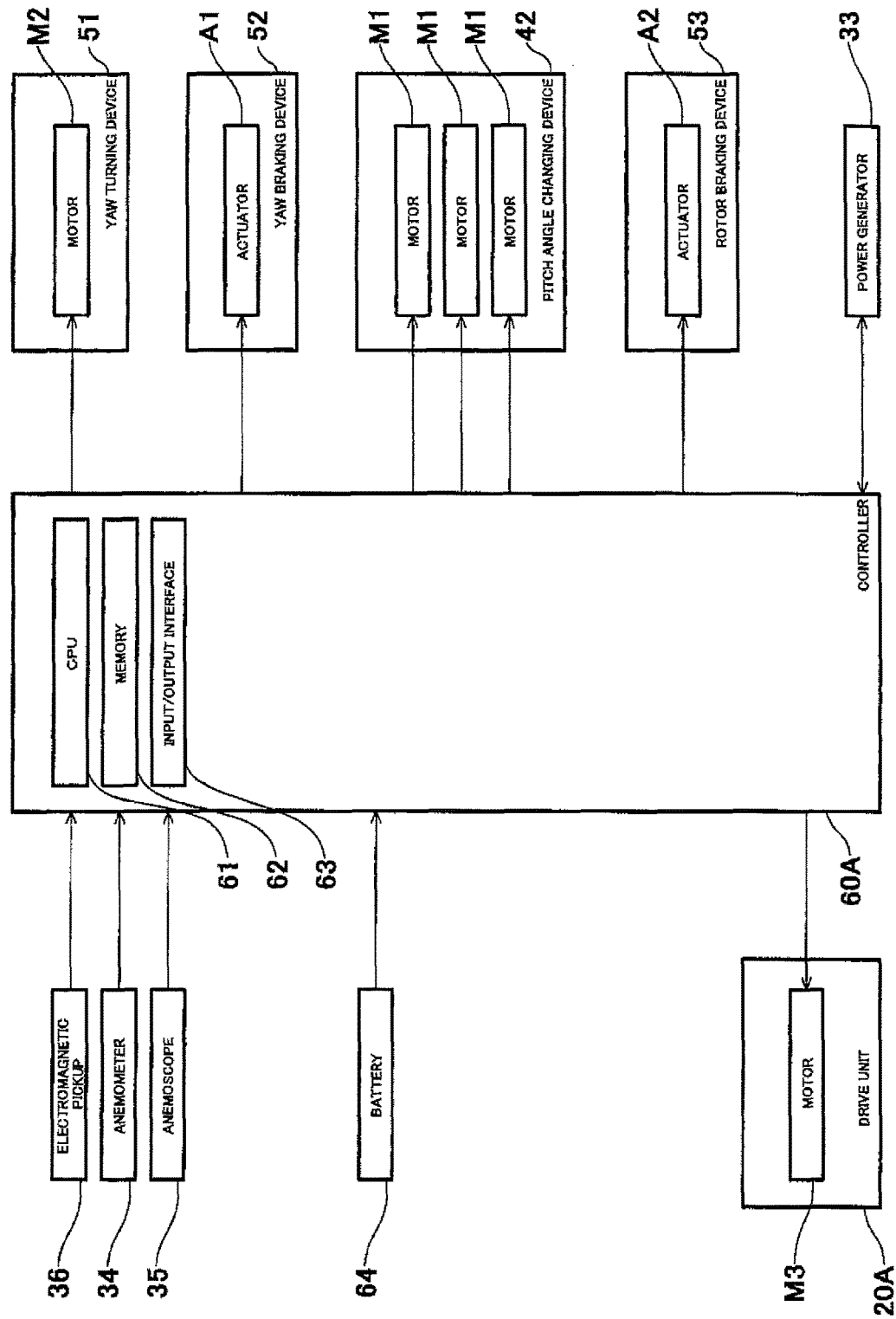
FIG. 14 is a block diagram showing a configuration of the control system of the wind turbine shown in FIG. 11.

The motor M3 is provided at the sleeve 85 of the moving unit 83. A pinion gear 834 is attached to a rotor shaft of the motor M3 so as to mesh with the spur gear 833. As shown in FIG. 14, the operation of the motor M3 is controlled by a controller 60A. As shown in FIG. 14, the controller 60A of Embodiment 2 is substantially the same in configuration as the controller 60 of Embodiment 1, but a drive unit 20A includes the motor M3, and the motor M3 is connected to the controller 60A.

The nut portion 84 is a tubular body, and a second threaded portion 841 that can be threadedly engaged with the first threaded portion 81 of the screw shaft 80 is formed on an inner peripheral surface of the nut portion 84. The sleeve 85 holds the nut portion 84 such that the nut portion 84 can rotate around the axis of the screw shaft 80. In addition, the sleeve 85 is provided so as to cover an outer periphery of the nut portion 84. A pair of rotation restricting portions 832 is provided at the sleeve 85. Each of the rotation restricting portions 832 is constituted by an L-shaped frame, and a tip end thereof is slidable along an inside of the square groove portion 82 of the screw shaft 80. The spur gear 833 is fixed to one end of the nut portion 84. The blade coupling portions 71a to 71c, the sleeve 85, and the coupling arms 72 constitute a link mechanism 74 in the coupling unit 7.

Ridgelines of screw threads of the first threaded portion 81 and ridgelines of screw threads of the second threaded portion 841 are formed at adequately fine pitches so as to be substantially orthogonal to the axial direction of the screw shaft 80. As one example, the first threaded portion 81 is formed as an external screw, and the second threaded portion 841 is formed as an internal screw.

When the motor M3 is driven in the moving unit 83, the driving force thereof is transferred to the nut portion 84 through the pinion gear 834 and the spur gear 833. With this, the nut portion 84 rotates around the axis of the screw shaft 80 in the sleeve 85, and the moving unit 83 moves in a direction toward the front side or the rear side along the axial direction of the screw shaft 80. A moving direction of the moving unit 83 can be switched by switching the rotational direction of the motor M3.

In Embodiment 2, a tilting mechanism 7A for the blades 6 includes the blade coupling portions 71a to 71c, the screw mechanism 8 provided at the hub 70, and the link mechanism 74. Further, a driving device 7C configured to operate the tilting mechanism 7A includes the motor M3. Switching between the standing state where the blades 6 stand and the tilted state where the blades 6 are tilted is performed by the controller 60A configured to control the operation of the motor M3.

Figure 15:
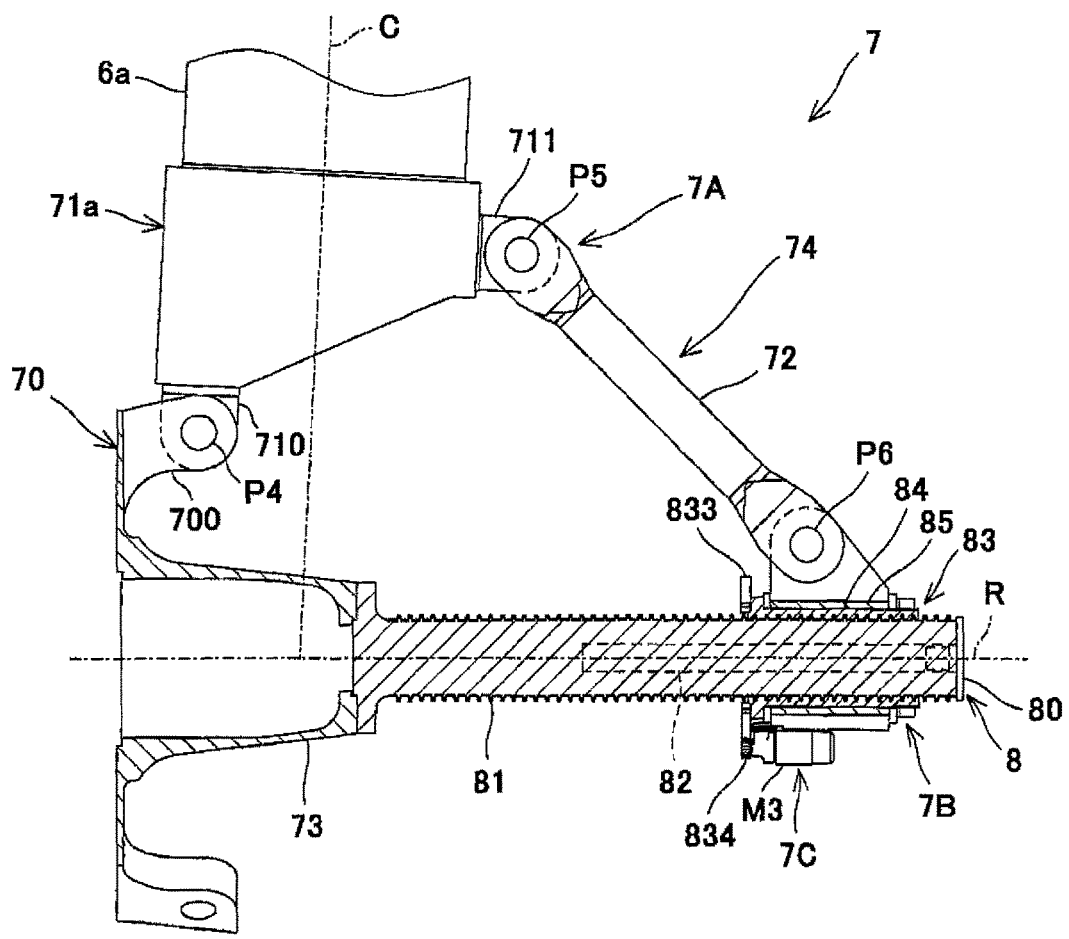
FIG. 15 is a partial cross-sectional view showing the structure of the coupling unit in the standing state.
Figure 16:
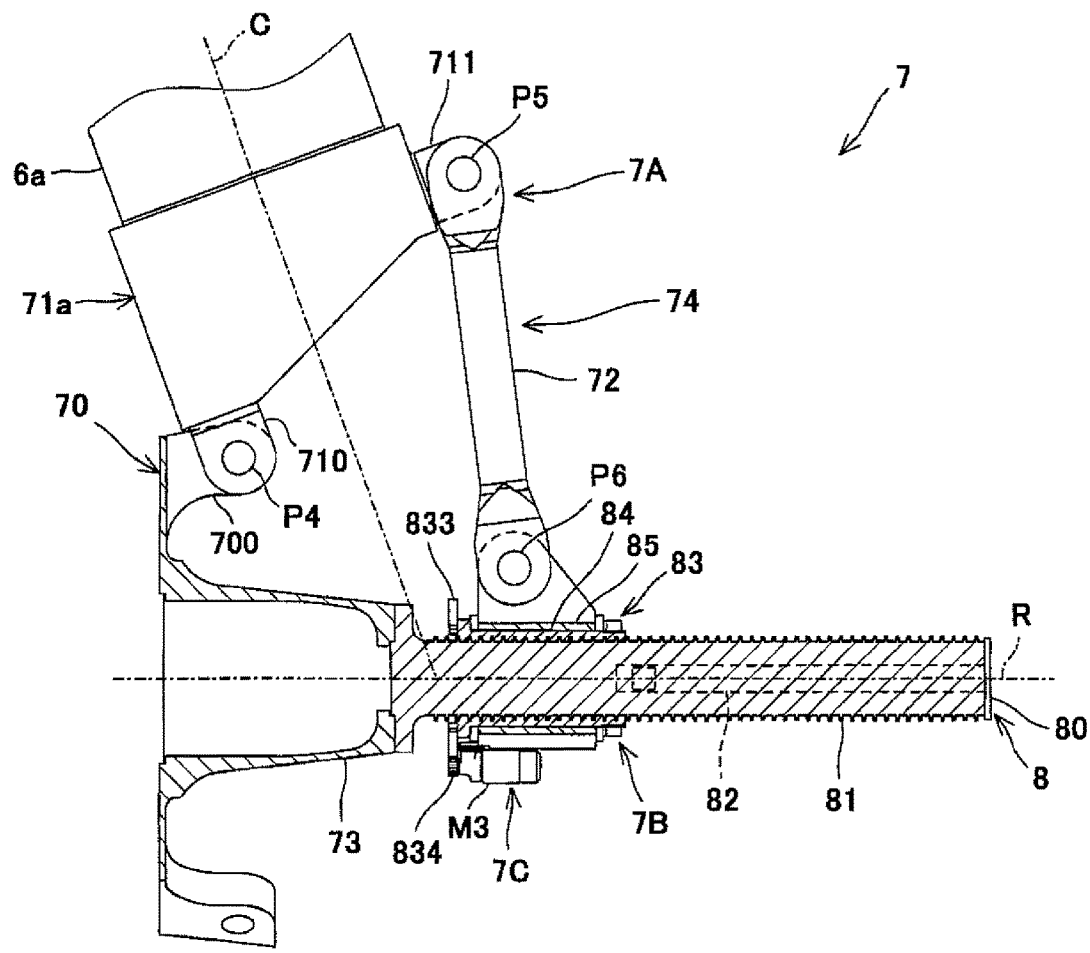
FIG. 16 is a partial cross-sectional view showing the structure of the coupling unit in the tilted state.

When the controller 60A drives the motor M3 to move the moving unit 83, each of the blade coupling portions 71a to 71c swings around the pivot P4. At this time, as shown in FIG. 15, when the nut portion 84 is moved toward a tip end (front side) of the screw shaft 80, each of the blade coupling portions 71a to 71c swings around the pivot P4 through the coupling arm 72, and the blades 6 stand to become the standing state. On the other hand, as shown in FIG. 16, when the nut portion 84 is moved toward a base end (rear side) of the screw shaft 80, each of the blade coupling portions 71a to 71c swings around the pivot P4 through the coupling arm 72, and the blades 6 become the tilted state. With this, the tilting mechanism 7A causes the blades 6 to tilt relative to the rotational plane around the rotation axis R to change the coning angles of the blades 6. Further, when the controller 60A switches the rotational direction of the motor M3, the blades 6 are switched between the standing state and the tilted state. Furthermore, a speed of the tilting operation and a speed of a standing operation can be adjusted by adjusting a speed of the motor M3. In FIGS. 15 an 16, for ease of explanation, only the blade coupling portion 71a and one bracket 831 coupled to the blade coupling portion 71a through the coupling arm 72 are shown among the three blade coupling portions 71a to 71c and the three brackets 831.

In Embodiment 2, as with Embodiment 1, during a normal electric power generation, the blades 6 receives predetermined wind loads in the rotational direction of the rotor and the tilting directions of the blades 6. Among these wind loads, the wind loads acting in the tilting directions of the blades 6 acts on the moving unit 83 from the blade coupling portions 71a to 71c through the coupling arms 72 in a direction toward a base end portion of the screw shaft 80. However, in the coupling unit 7, as described above, the ridgelines of the screw threads of the first threaded portion 81 and the ridgelines of the screw threads of the second threaded portion 841 are formed so as to be substantially orthogonal to the axial direction of the screw shaft 80. With this, the movement of a portion of the first threaded portion 81, which portion is threadedly engaged with the second threaded portion 841, by the wind loads from the blades 6 is restricted by static friction between the first threaded portion 81 and the second threaded portion 841. Therefore, the blades 6 can be supported against the wind loads acting in the tilting directions. Further, by restricting the movement of the portion of the first threaded portion 81 which portion is threadedly engaged with the second threaded portion 841, the postures of the blades 6 can be fixed. As above, in the coupling unit 7 of Embodiment 2, a fixing/supporting mechanism 7B including a self-lock mechanism is configured by using the first threaded portion 81 and the second threaded portion 841.

Further, as described above, in the coupling unit 7, the wind loads acting in the tilting directions are supported by the portion where the first threaded portion 81 and the second threaded portion 841 are threadedly engaged with each other, and therefore, these wind loads are less likely to act on the motor M3. On this account, when causing the blades 6 to become the tilted state, the blades 6 can be smoothly tilted by the motor M3. With this, the stable behaviors of the wind turbine 1 for a long period of time can be expected. Further, since an excessive load is less likely to act on the motor M3 from the blades 6, the motor M3 can be reduced in size or simplified.

To more surely fix and support the blades 6, the motor M3 with a brake may be used. Even in this case, a required holding torque of the brake can be reduced, so that the brake having a simplified structure can be configured.

Further, in the coupling unit 7, the screw shaft 80 is provided in a region surrounded by the blade coupling portions 71a to 71c, and the moving unit 83 on which the wind loads from the blades 6 act is provided at a position away from the pivots P4 and P5 each of which is the rotational center in the tilting operation. With this, a required load capacity of the moving unit 83 can be reduced. Thus, the production of the coupling unit 7 is facilitated, and the coupling unit 7 can be reduced in size and simplified.

The coupling unit 7 is configured such that: the screw shaft 80 is fixed to the hub 70; and by rotating the nut portion 84 around the axis of the screw shaft 80 by the driving force of the motor M3, the screw shaft 80 and the moving unit 83 are moved relatively. However, the coupling unit 7 may be configured such that: the screw shaft 80 is axially supported by the hub 70 so as to be rotatable around the axis of the screw shaft 80; and by rotating the screw shaft 80 relative to the nut portion 84 by the driving force of the motor M3, the screw shaft 80 and the moving unit 83 are moved relatively. In this case, the groove portions 82 and the rotation restricting portions 832 are omitted. However, since the moving unit 83 is coupled to the plurality of coupling arms 72, the moving unit 83 does not rotate together with the screw shaft 80.

Others

The present invention is not limited to the above embodiments, and modifications, additions, and eliminations may be made within the scope of the present invention.

In each of the above embodiments, the number of blades 6 is three. However, the present invention is not limited to this, and the number of blades 6 may be two or not less than four.

Each of the power cylinders S1 to S3 is not limited to a hydraulic cylinder, and any of the power cylinders S1 to S3 may be a different type of power cylinder. Examples of the power cylinder include a pneumatic cylinder, a water pressure cylinder, and an electric-powered cylinder. Further, each of the power cylinders S1 to S3 may be a single-shaft power cylinder or a double-shaft power cylinder.

In Embodiment 1, any of the power cylinders S1 and S2 may be omitted by adjusting the position of the power cylinder at the frame portion 401. For example, when using only the power cylinder S2 and switching from the standing state to the tilted state, the rod 10b is once contracted, the blade coupling portion 41a, 41b, or 41c is moved to a predetermined position, and then, the rod 10b is expanded again. Even when switching from the standing state to the tilted state, the rod 10b is controlled in the same manner as above. With this, in each of the standing state and the tilted state, the postures of the blades 6 can be supported by bringing the blade coupling portions 41a to 41c into contact with the respective rods 10b.

INDUSTRIAL APPLICABILITY

As above, one aspect of the present invention has an excellent effect of being able to provide the upwind wind turbine capable of surely supporting and fixing the blades in the standing state at a normal time and the like and smoothly tilting the blades in an emergency and the like. Therefore, the aspect of the present invention is useful when it is widely applied as the upwind wind turbine that can achieve the significance of this effect.

REFERENCE SIGNS LIST

P1 to P6 pivot
R rotation axis
S1 to S3 power cylinder
M1 to M3 motor
1 wind turbine
2 support post
3 nacelle
4, 7 coupling unit
4A, 7A tilting mechanism
4B, 7B fixing/supporting mechanism
4C, 7C driving device
5 rotor
6 (6a, 6b, 6c) blade
8 screw mechanism
10a to 10d rod
20, 20A drive unit
40, 70 hub
41a to 41c, 71a to 71c blade coupling portion
45 contact portion
60, 60A controller
72 coupling arm
74 link mechanism
80 screw shaft
81 first threaded portion
83 moving unit
84 nut portion
85 sleeve
401 frame portion
402, 403 through hole
405 fixed member
414 lever tip end portion
841 second threaded portion

The invention claimed is:

1. An upwind wind turbine comprising:
a hub configured to rotate around a rotation axis;
a plurality of blades configured to rotate together with the hub;
a tilting mechanism configured to couple the hub and the plurality of blades such that the plurality of blades are tiltable relative to a rotational plane around the rotation axis, the tilting mechanism including a plurality of blade coupling portions coupled to the hub so as to be swingable, and the plurality of blade coupling portions are respectively coupled to the plurality of blades;
a driving device configured to drive the tilting mechanism to switch between a standing state where the plurality of blades extend along the rotational plane around the rotation axis, and a tilted state where the plurality of blades are tilted relative to the rotational plane around the rotation axis; and
a fixing/supporting mechanism provided independently from the tilting mechanism and the driving device, the fixing/supporting mechanism including support members, the fixing/supporting mechanism being configured to switch between a locked state where the plurality of blades in the standing state are prevented from tilting by the support members contacting the plurality blade coupling portions to fix coning angles of the plurality of blades, and an unlocked state where the plurality of blades are released from contact with the support members to allow the plurality of blades to tilt into the tilted state.

2. The upwind wind turbine according to claim 1, wherein:
coupled portions where the plurality of blades are coupled to the respective blade coupling portions at the hub are arranged around the rotation axis;
each of the blade coupling portions includes a triangular lever structure extending from the coupled portion to the rotation axis; and
the fixing/supporting mechanism is provided proximate to the rotation axis such that a distance between the fixing/supporting mechanism and the rotation axis is shorter than a distance between the coupled portion and the rotation axis.

3. The upwind wind turbine according to claim 1, wherein:
the fixing/supporting mechanism includes:
a plurality of frame portions each extending from the hub toward a front side of the upwind wind turbine, and
a plurality of contact portions each provided at the respective frame portions to be allowed to contact the plurality of blade coupling portions in the standing state; and
the coning angles of the plurality of blades in the standing state are fixed by bringing the plurality of blade coupling portions into contact with the respective plurality of contact portions.

4. The upwind wind turbine according to claim 3, wherein:
the plurality of blades are switched to the standing state by bringing the plurality of blade coupling portions into contact with the respective plurality of contact portions; and
the plurality of blades are switched to the tilted state by terminating the contacts between the plurality of blade coupling portions and the plurality of contact portions.

5. The upwind wind turbine according to claim 3, wherein:
the fixing/supporting mechanism includes lock cylinders; and
the plurality of contact portions are rods of the lock cylinders.

6. The upwind wind turbine according to claim 1, wherein:
the driving device includes tilt cylinders; and
the tilt cylinders are coupled to the hub and the respective blade coupling portions.

7. An upwind wind turbine comprising:
a hub configured to rotate around a rotation axis;
a plurality of blades configured to rotate together with the hub;
a tilting mechanism configured to couple the hub and the plurality of blades such that the plurality of blades are tiltable relative to a rotational plane around the rotation axis, the tilting mechanism including:
a plurality of blade coupling portions that are coupled to the hub so as to be swingable, the plurality of blade coupling portions being coupled to the respective plurality of blades,
a screw mechanism including a screw shaft provided on the rotation axis, and
a link mechanism configured to couple a nut portion of the screw mechanism to the plurality of blade coupling portions, the link mechanism being configured to swing the plurality of blade coupling portions in accordance with a movement of the nut portion, and the link mechanism coupling the nut portion to the plurality of blade coupling portions through a sleeve configured to rotatably hold the nut portion; and a driving device configured to drive the tilting mechanism to switch between a standing state where the plurality of blades extend along the rotational plane around the rotation axis, and a tilted state where the plurality of blades are tilted relative to the rotational plane around the rotation axis.

8. The upwind wind turbine according claim 7, wherein coupled portions, where the plurality of blades are coupled to the respective plurality of blade coupling portions at the hub, are arranged around the rotation axis.

* * * * *